(12) United States Patent
Borah et al.

(10) Patent No.: US 12,288,911 B2
(45) Date of Patent: Apr. 29, 2025

(54) ELECTROLYTE COMPOSITIONS

(71) Applicant: VICTORIA LINK LIMITED, Kelburn (NZ)

(72) Inventors: Rohan Borah, Shortland (AU);
Thomas Nann, Cooks Hill (AU);
Fraser Ross Hughson, Thorndon (NZ)

(73) Assignee: VICTORIA LINK LIMITED, Kelburn (NZ)

( * ) Notice: Subject to any disclaimer, the term of this patent is extended or adjusted under 35 U.S.C. 154(b) by 880 days.

(21) Appl. No.: 17/414,197

(22) PCT Filed: Dec. 20, 2019

(86) PCT No.: PCT/NZ2019/050164
§ 371 (c)(1),
(2) Date: Jun. 15, 2021

(87) PCT Pub. No.: WO2020/130857
PCT Pub. Date: Jun. 25, 2020

(65) Prior Publication Data
US 2022/0200034 A1 Jun. 23, 2022

(30) Foreign Application Priority Data

Dec. 20, 2018 (AU) .............................. 2018904852
Aug. 29, 2019 (AU) .............................. 2019903154

(51) Int. Cl.
*H01M 8/18* (2006.01)
*H01G 11/60* (2013.01)
(Continued)

(52) U.S. Cl.
CPC ............ *H01M 8/188* (2013.01); *H01G 11/60* (2013.01); *H01G 11/62* (2013.01);
(Continued)

(58) Field of Classification Search
CPC ................................................. H01M 10/0566
See application file for complete search history.

(56) References Cited

U.S. PATENT DOCUMENTS 2,441,896 A 5/1948 Moir
8,163,204 B2 4/2012 Elliott et al.
(Continued)

FOREIGN PATENT DOCUMENTS

CN 102210050 A 10/2011
CN 103310984 A 9/2013
(Continued)

OTHER PUBLICATIONS

International Search Report and Written Opinion issued on Mar. 2, 2020 for corresponding PCT Application No. PCT/NZ2019/050164.
(Continued)

*Primary Examiner* — Maria Laios
*Assistant Examiner* — Jordan E Berresford
(74) *Attorney, Agent, or Firm* — POLSINELLI PC

(57) ABSTRACT

Disclosed are electrolyte compositions for electrochemical devices, where the electrolyte compositions comprise a microemulsion and where the microemulsion comprises an aqueous phase and a water-immiscible phase. Also disclosed are microemulsion electrolyte compositions for electrically rechargeable electrochemical energy storage devices, including ion batteries (such as lithium ion, sodium ion, magnesium ion, calcium ion, and aluminium ion batteries), redox flow batteries and supercapacitors.

19 Claims, 24 Drawing Sheets

(51) Int. Cl.
*H01G 11/62* (2013.01)
*H01M 10/0566* (2010.01)
*H01M 10/26* (2006.01)

(52) U.S. Cl.
CPC ....... *H01M 10/0566* (2013.01); *H01M 10/26* (2013.01); *H01M 2300/0002* (2013.01); *H01M 2300/0091* (2013.01)

(56) References Cited

U.S. PATENT DOCUMENTS

| | | | |
|---|---|---|---|
| 2003/0180608 A1 | 9/2003 | Mori et al. | |
| 2007/0082246 A1* | 4/2007 | Han | H01M 8/04197 429/492 |
| 2011/0250515 A1 | 10/2011 | Van Raalten et al. | |
| 2011/0300469 A1* | 12/2011 | Ono | H01M 8/1023 429/492 |
| 2012/0178017 A1 | 7/2012 | Murai et al. | |
| 2012/0326073 A1 | 12/2012 | Lynd et al. | |
| 2013/0171484 A1 | 7/2013 | Baginska et al. | |
| 2013/0242466 A1 | 9/2013 | Masheder et al. | |
| 2014/0230679 A1 | 8/2014 | Goodridge et al. | |
| 2015/0207165 A1* | 7/2015 | Schubert | H01M 8/20 429/105 |
| 2016/0093923 A1 | 3/2016 | Wang et al. | |
| 2018/0053968 A1 | 2/2018 | Sava Gallis et al. | |
| 2018/0072669 A1 | 3/2018 | Liu et al. | |

FOREIGN PATENT DOCUMENTS

| | | | |
|---|---|---|---|
| EP | 0346932 A2 | 12/1989 | |
| EP | 2335313 A1 | 6/2011 | |
| GB | 603409 A | 6/1948 | |
| JP | 2011108388 A | 6/2011 | |
| WO | 9520634 | 8/1995 | |
| WO | 03064565 A2 | 8/2003 | |
| WO | WO-2005061629 A1 * | 7/2005 | ............ C08L 101/02 |
| WO | 2007059707 A1 | 5/2007 | |
| WO | 2010041937 A1 | 4/2010 | |
| WO | WO-2017186873 A1 * | 11/2017 | |
| WO | 2019079047 A1 | 4/2019 | |

OTHER PUBLICATIONS

Hopkins, et al., "Suppressing corrosion in primary aluminum—air batteries via oil displacement," Science, vol. 362, 2018, pp. 658-661.
Anthony King, "Oil boosts battery shelf life by suppressing corrosion," 2018, pp. 1-3.
Mitsuru Wakisaka et al., "Direct electrochemical hydrogenation of toluene at Pt electrodes in a microemulsion electrolyte solution," Electrochemistry Communications, 2016, pp. 1-14.
Supplementary European Search Report and Written Opinion issued on Aug. 3, 2022 for corresponding European Application No. 19 89 8960.
Chinese Office Action and English translation, issued on Oct. 8, 2022 for corresponding Chinese Application No. 201980078281.3.
Japanese Office Action and English translation, issued on Oct. 3, 2023 for corresponding Japanese Application No. 2021-534205.
Second Chinese Office Action and English translation, issued on Jul. 28, 2023 for corresponding Chinese Application No. 201980078281.3.

* cited by examiner

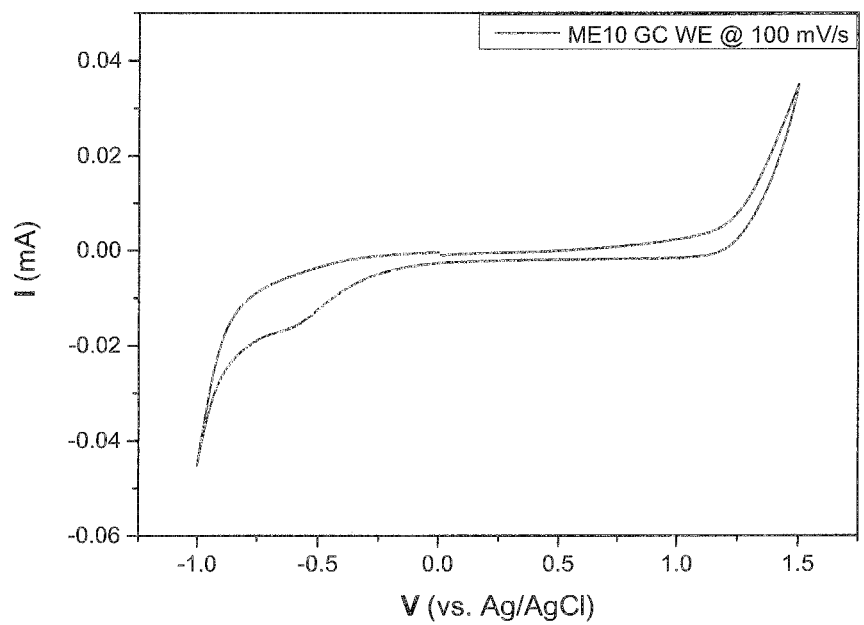
Fiugre 7
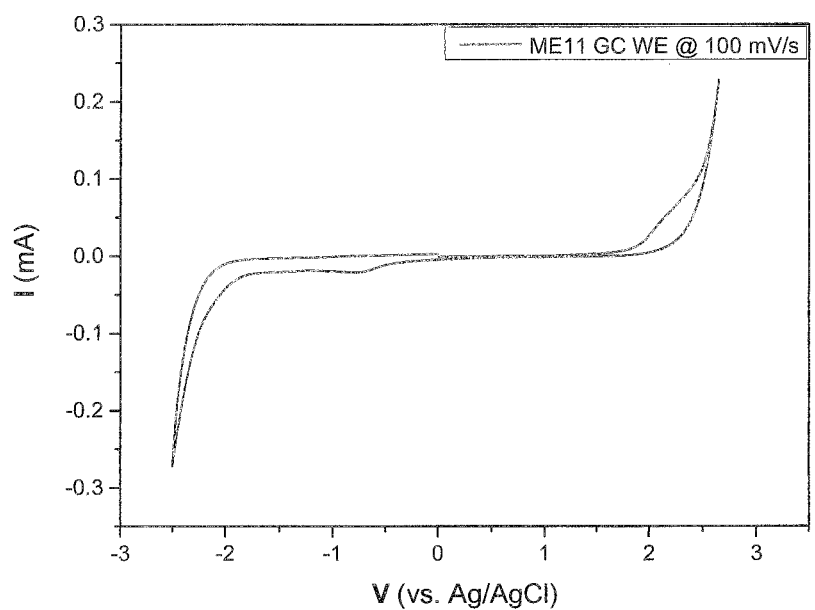
Figure 8

ELECTROLYTE COMPOSITIONS

CROSS-REFERENCE TO RELATED APPLICATIONS

This application is a national stage application (under 35 U.S.C. § 371) of PCT/NZ2019/050164, filed Dec. 20, 2019, which claims benefit of Australian Application Nos. 2018904852, filed Dec. 20, 2018, and 2019903154, filed Aug. 29, 2019, which are incorporated herein by reference in their entireties.

TECHNICAL FIELD

The present invention relates to microemulsion electrolyte compositions, and their use in electrochemical energy storage devices.

BACKGROUND

Electrochemical systems, in particular batteries, need an electrolyte which can facilitate dissolution and migration of ions and electrochemically active species. Desirable, or even necessary, properties of an electrolyte are good conductivity, a wide electrochemical window, and an ability to solubilise salts and electrochemically active species used in the battery. Low cost is an economic consideration for commercial applications of electrolytes.

Water is a desirable electrolyte solvent because it is a cheap solvent that is non-toxic and can be safely handled.

A drawback of water for use as an electrolyte solvent is that the electrochemical stability window of water, 1.23 V, is too narrow to support many electrochemical couples used in modern batteries.

Water can be oxidised to form oxygen gas and reduced to form hydrogen gas (commonly referred to as water splitting) at a potential of 1.23V:

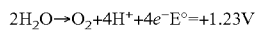
$2H_2O \rightarrow O_2 + 4H^+ + 4e^-\ E° = +1.23V$

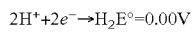
$2H^+ + 2e^- \rightarrow H_2\ E° = 0.00V$

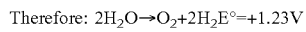
Therefore: $2H_2O \rightarrow O_2 + 2H_2\ E° = +1.23V$

Batteries using aqueous electrolytes are therefore limited to operate with cell voltages below 1.23 V to avoid degradation. Reactions with potentials which fall outside of the electrochemical stability window would cause water splitting and the evolution of hydrogen and/or oxygen. These reactions deteriorate the electrochemical system, and present a safety hazard to the user. This is a significant limitation because modern batteries, for example, are able to run at potentials significantly greater than 1.23 V, meaning that water cannot be used as an electrolyte.

It is worth noting that the thermodynamic potential of the water splitting reaction is about −0.2 V vs. Ag/AgCl for reduction and about 1 V vs. Ag/AgCl for oxidation, resulting in an overall theoretical window of 1.23 V. However, practical applications of the water splitting reactions experience a non-trivial over-potential. The measured magnitude of the onset potential for oxidation and/or reduction is typically a larger voltage than what is theoretically expected. Whilst it is therefore possible to operate an aqueous battery beyond the thermodynamic limit of 1.23 V, known aqueous electrolytes undergo significant decomposition beyond this limit in normal use, and so exceeding the thermodynamic limit of the aqueous electrolyte is avoided.

Attempts to extend the electrochemical stability window of water have been made in the past. Aqueous electrolytes have been reported to widen electrochemical stability windows compared to bulk water, but these advances have not been sufficient to replace non-aqueous electrolytes in many applications. Further, materials used in electrodes and as electrolyte additives required in these attempts are costly and/or hazardous.

Non-aqueous solvents having electrochemical windows wider than bulk water are used in many electrochemical cells including some batteries. However, there are drawbacks to non-aqueous solvents, such as their expense compared to water, toxicity, flammability and/or their reduced ability to solubilise salts.

Since water as a solvent can solubilise salts, including inorganic and many organic salts, it is an ideal solvent (in this respect) for use as a battery electrolyte. Increasing the concentration of dissolved salts in an aqueous solution increases the charge conductivity of the solution. Further, water also has the ability to solubilise some non-ionic compounds, such as some redox active organic molecules, and allows the aqueous electrolyte to be applied to a range of batteries with different electrochemically active species.

The current of an operating electrochemical cell is dependent on the concentration of the electrochemically active species involved in an electrochemical reaction. The more an electrochemically active species is dissolved in the electrolyte, the higher the concentration of active species and hence the higher the current that can be extracted from the electrochemical cell. For water-soluble electrochemically active species such as metal salts, using water as a solvent allows for a relatively high salt concentration. However, the current that can be produced by an electrochemical cell with an aqueous electrolyte is reduced where electrochemically active species are less soluble in water. As water-insoluble electrochemically active species are often incompatible with aqueous solvents, and water soluble active species are often incompatible with organic solvents, there are significant difficulties in finding compatible solvents and active species in which the conductivity of the electrolyte and the concentration of the active species in the electrolyte can be simultaneously maximised.

An example of the limitations in known electrolyte compositions can be found in ion batteries including magnesium ion batteries, sodium ion batteries, aluminium ion batteries and lithium ion batteries. For example, magnesium ion batteries have been plagued by the cost and complexity of the magnesium salts and organic solvents necessary to achieve the requisite conductivity, solubility and electrochemical window to make a useful magnesium battery.

Limitations of known electrolyte compositions are also apparent in flow batteries. Flow batteries, such as redox flow batteries, are characterised by the use of an electrolyte (specifically, an anolyte and catholyte) that flows over the surface of non-reactive electrodes separated by an exchange membrane. Anolytes and catholytes comprising electrochemically active species are contained in separate compartments. In use, anolytes and catholytes are pumped over their respective electrodes, and electrical current is generated by the transfer of charge between the compartments. As energy is stored in the electrolyte, the storage capacity of the battery scales with improvements to the electrolyte composition and electrolyte volume. Increasing the volume of electrolyte increases the energy that can be stored. Consequently, the economic cost of energy from flow batteries is, in part, proportionate to the cost of the electrolyte. As with other types of electrochemical cells, the efficiency of redox flow batteries may be enhanced by electrolytes that can support higher concentrations of electrochemically active species and electrolytes that have a wider electrochemical stability window.

As a result, the performance of batteries is highly dependent on many factors including the physicochemical properties of the materials from which the electrode(s) of the battery are made and the electrolyte solutions. Such factors affect battery performance by decreasing the battery voltage, affecting coulombic efficiency, lowering the rate capability (maximum charge/discharge rate) of the cell, and cell stability.

There is therefore a need for an electrolyte composition that provides a wide electrochemical window in which electrochemistry can be performed; exhibits good conductivity; is low cost; and has the ability to dissolve compounds across a range of polarities.

It is an object of the present invention to provide an electrolyte composition, and/or its use in an electrochemical cell such as an ion battery, redox flow battery and supercapacitor that overcomes at least one of the abovementioned disadvantages, or addresses or partially addresses at least one of the abovementioned needs, or at least provides the public with a useful choice.

SUMMARY OF THE INVENTION

In an aspect, there is provided an electrolyte composition suitable for, adapted for, or configured for an electrochemical cell, wherein the electrolyte composition comprises a microemulsion. The microemulsion comprises an aqueous phase and a water-immiscible phase.

In an example, the aqueous phase is a continuous phase. The water-immiscible phase may be dispersed in a continuous aqueous phase or alternatively, the microemulsion may be a bicontinuous microemulsion such that the water-immiscible phase and the aqueous phase are both continuous phases.

In a preferred embodiment, the microemulsion is an oil-in-water microemulsion or a bicontinuous microemulsion.

The microemulsion may comprise between 1% and 99% water by weight of the microemulsion, including, for example, between 10% and 99% water by weight of the microemulsion, and between 20% and 99% water by weight of the microemulsion.

Where the microemulsion comprises a continuous aqueous phase and a dispersed water-immiscible phase (i.e. an oil-in-water microemulsion), the microemulsion may comprise between 80% and 99% water by weight of the microemulsion. Where the microemulsion is a bicontinuous microemulsion, the microemulsion may comprise between 20% and 80% water by weight of the microemulsion.

The microemulsion may comprise a dissolved salt, for example to increase the electrical conductivity of the microemulsion. The dissolved salt may be an organic salt, an inorganic salt, or a combination thereof. In an example, the dissolved salt is selected from the group consisting of: a lithium salt, a sodium salt, a potassium salt, a magnesium salt, a calcium salt, an aluminium salt, and a combination thereof. In an example, the concentration of salts in the microemulsion electrolyte composition is between 0 and 10 M, between about 0.001 M and 10 M, more preferably between about 0.01 M and 5 M, more preferably between 0.05 M and 1 M, most preferably between about 0.05 M and 0.5 M. In another example, the concentration of salts in the microemulsion electrolyte composition is between 0 and 10 mol/kg, more preferably between about 0.001 mol/kg and 10 mol/kg, more preferably about 0.01 mol/kg and 5 mol/kg, more preferably between 0.05 mol/kg and 1 mol/kg.

The microemulsion may comprise one or more electrochemically active species. The electrochemically active species are dissolved in the water-immiscible phase or aqueous phase of the microemulsion. The electrochemically active species may be redox active organic species. Redox active organic species, and electrochemically active species, would be readily known and understood to those of skill in the art. Examples of redox active organic species that may be dissolved in the microemulsion include: ferrocene, (2,2,6,6-tetramethylpiperidin-1-yl)oxyl (TEMPO), phenothiazines, dimethoxybenzene, menadione and 2,1,3-benzothiadiazole.

The water-immiscible phase of the microemulsion may comprise an organic solvent. In an example, the water-immiscible phase may be selected from: aliphatic solvents such as hexane, cyclohexane, petroleum ether; aromatic solvents such as benzene, toluene, p-xylene, 1,2-dichlorobenzene; halogenated solvents such as dichloromethane, chloroform, dichloroethane; substantially water immiscible ketone solvents such as acetophenone; substantially water immiscible ester solvents such as ethyl benzoate, ethyl acetate; ether solvents such as diethyl ether; and a combination thereof.

The microemulsion may comprise one or more amphiphiles, such as a surfactant, a co-surfactant and/or co-solvent. Suitable surfactants and co-surfactants for the preparation of microemulsion electrolyte compositions will be known in the art. Examples of suitable surfactants include anionic surfactants, cationic surfactants, zwitterionic surfactants and non-ionic surfactants. Examples of preferred surfactants include Triton X-100 (t-octylphenoxypolyethoxyethanol), cetyltrimethylammonium chloride (CTAC), cetylpyridinium chloride (CPC), benzalkonium chloride, benzethonium chloride, sodium dodecyl sulfate (SDS), and sodium lauryl ether sulfate (SLES). Examples of suitable co-surfactants or co-solvents include aliphatic alcohols, such as C2-C6 alcohols, and amines, such as C2-C6 alkyl amines. Preferred co-surfactants and/or co-solvents for the present invention include ethanol, propanol, butanol and pentanol.

The microemulsion may comprise one or more phase transfer catalysts. An example of a suitable phase transfer catalyst is bis(2-methoxyethyl) ether (diglyme).

In an example of the present invention, the microemulsion has a conductivity of more than 0.1 mS·cm$^{-1}$, more than 1 mS·cm$^{-1}$, more than 3 mS·cm$^{-1}$, more than 5 mS·cm$^{-1}$, between 1 and 12 mS·cm$^{-1}$, between 3 and 10 mS·cm$^{-1}$.

In an example of the present invention, the microemulsion has an electrochemical stability window of greater than 1.23 V, greater than 1.5 V, greater than 2 V, greater than 2.5 V, greater than 3 V, greater than 3.5 V, or greater than 4 V.

In a further aspect of the present invention, there is provided an electrolyte composition suitable for, adapted for, or configured for an ion battery, wherein the electrolyte composition comprises the microemulsion.

In another aspect of the present invention, there is provided an electrolyte composition suitable for, adapted for, or configured for redox flow battery, wherein the electrolyte composition comprises the microemulsion.

In a further aspect of the present invention, there is provided an electrolyte composition suitable for, adapted for, or configured for a supercapacitor, wherein the electrolyte composition comprises the microemulsion.

In a further aspect of the present invention, there is provided a microemulsion which is suitable for use, or adapted for use, or configured for use as an electrolyte in an electrochemical cell.

In an example of the present invention, the electrolyte composition consists essentially of the microemulsion.

In a further aspect of the present invention, there is provided a microemulsion comprising one or more electrochemically active species.

In an example according to this aspect of the present invention, the microemulsion comprises an aqueous phase and a water-immiscible phase. Preferably, the microemulsion is an oil in water microemulsion or a bicontinuous microemulsion.

In an example according to this aspect of the present invention, the one or more electrochemically active species is dissolved in the water-immiscible phase. In an alternative example, the one or more electrochemically active species is dissolved in the aqueous phase.

The electrochemically active species may be a dissolved salt. The electrochemically active species may be a redox active organic species.

In an example according to this aspect of the present invention, at least one of the electrochemically active species or redox active organic species have a reaction potential, or redox potential, of greater than 1.23 V (compared to a standard hydrogen electrode). That is, the electrochemical reaction of the electrochemically active species or redox active organic species would cause water splitting of bulk water.

In a further aspect of the present invention, there is provided a microemulsion comprising an aqueous phase, wherein the electrochemical stability window of the microemulsion is greater than 1.23 V.

The microemulsion may comprise an electrochemically active species. In an example, at least one of the electrochemically active species have a reaction potential, or redox potential, of greater than 1.23 V.

The electrochemically active species may be a redox active organic species, examples of which are described herein.

In a further aspect of the present invention, there is provided an electrochemical cell comprising an electrolyte, wherein the electrolyte comprises a microemulsion. The microemulsion comprises an aqueous phase and a water-immiscible phase.

In an example, the electrochemical cell is an electrochemical energy storage device (EESD). EESDs store energy in the form of chemical energy. Electrical energy, in the form of an electrical current, is released during discharging of the device by converting chemical energy to electric energy. EESDs include two electrodes (e.g. an anodic electrode and a cathodic electrode), an electrolyte in electrical contact with the electrodes and, optionally, an ion permeable separator. EESDs generate an electrical potential difference between the electrodes. Examples of EESDs include supercapacitors, ion batteries and flow batteries.

In an example, the EESD is an electrically rechargeable EESD. Electrically rechargeable EESDs comprise electrochemically active species that reversibly react to either generate (during discharge) or store (during charge) electrical energy. Electrically rechargeable EESDs are charged by the input of electrical energy, which restores the electrochemically active species. During discharge, the electrochemically active species react to generate an electrical current. During charging, an externally applied potential drives the reverse reaction to restore the electrochemically active species. Examples of electrically rechargeable EESDs include supercapacitors, ion batteries and flow batteries.

In an example, the EESD is not a fuel cell. In an example, the electrically rechargeable EESD is not a fuel cell.

In an example of the present invention, the electrolyte consists essentially of a microemulsion.

In an example, the electrochemical cell has a cell voltage of greater than 1.23 V, greater than 1.5 V, greater than 2 V, greater than 2.5 V, greater than 3 V, greater than 3.5 V, or greater than 4 V. In an example of the present invention, the electrochemical cell has a cell voltage of between 0.01 V and 4 V, between 1.0 and 4.0 V, between 1.23 V and 4.0 V, between 1.23 and 3.5 V, between 1.23 and 3.0 V, between 1.23 and 2.5 V, or between 1.23 and 2.0 V.

In an example, the aqueous phase is a continuous phase. The water-immiscible phase may be dispersed in a continuous aqueous phase or alternatively, the microemulsion may be a bicontinuous microemulsion such that the water-immiscible phase and the aqueous phase are both continuous phases.

In a preferred embodiment, the microemulsion is an oil-in-water microemulsion or a bicontinuous microemulsion.

In an example, the electrolyte is in electrical contact with the electrodes of the electrochemical cell.

In an example, the electrochemical cell may be selected from an ion battery. The ion battery may be a lithium ion battery, a magnesium ion battery, a calcium ion battery, an aluminium ion battery, a potassium ion battery or a sodium ion battery. In an example, the battery includes an anode, a cathode, the microemulsion electrolyte composition and, optionally, an ion-permeable separator, such as an ion-permeable membrane (e.g. disposed between the anode and the cathode). In an example, the electrolyte composition is in electrical contact with the anode and cathode.

The battery may include a current collector. Preferred current collectors comprise a substantially hydrophobic or lipophilic surface which is configured to contact the electrolyte.

Examples of substantially hydrophobic or lipophilic surfaces include non-metallic conductive surfaces, conductive carbon (e.g. graphite and carbon black), and conductive polymers such as conjugated polymers (polypyrrole, polythiophene, polyanilines). Preferred examples of substantially hydrophobic or lipophilic surfaces include glassy carbon and graphite surfaces.

In an example, the electrochemical cell is a supercapacitor. The supercapacitor may comprise anodic and cathodic electrodes, optionally, an ion-permeable separator, and the microemulsion electrolyte composition of the present invention. The electrodes may comprise a substantially hydrophobic or lipophilic surface in contact with (or configured to contact) the microemulsion. The electrodes may comprise high surface area materials such as zeolites and molecular sieves. The electrodes should comprise conductive materials. Suitable conductive materials include graphite or carbon black. The electrolyte of the supercapacitor is the microemulsion electrolyte composition of the present invention.

In an example, the electrochemical cell is a sensor.

In a further aspect of the present invention, there is provided an electrochemical cell comprising an electrolyte, wherein the electrolyte comprises or consists essentially of a microemulsion and wherein the microemulsion has an electrochemical stability window of greater than 1.23 V, greater than 1.5 V, greater than 2 V, greater than 2.5 V, greater than 3 V, greater than 3.5 V, greater than 4 V.

In a further aspect of the present invention, there is provided an electrochemical cell comprising an electrolyte, wherein the electrolyte comprises or consists essentially of a microemulsion, wherein the electrochemical cell has a cell voltage of greater than 1.23 V, 1.5 V, greater than 2 V, greater than 2.5 V, greater than 3 V, greater than 3.5 V, greater than 4 V.

In a further aspect of the present invention, there is provided a sodium ion battery comprising an electrolyte, wherein the electrolyte comprises or consists essentially of a microemulsion.

In a further aspect of the present invention, there is provided a magnesium ion battery comprising an electrolyte, wherein the electrolyte comprises or consists essentially of a microemulsion.

In a further aspect of the present invention, there is provided a lithium ion battery comprising an electrolyte, wherein the electrolyte comprises or consists essentially of a microemulsion, wherein the microemulsion comprises a lithium salt.

In a further aspect of the present invention, there is provided an aluminium ion battery comprising an electrolyte, wherein the electrolyte comprises or consists essentially of a microemulsion, wherein the microemulsion comprises an aluminium salt.

In a further aspect of the present invention, there is provided a potassium ion battery comprising an electrolyte, wherein the electrolyte comprises or consists essentially of a microemulsion, wherein the microemulsion comprises a potassium salt.

In a further aspect of the present invention, there is provided a calcium ion battery comprising an electrolyte, wherein the electrolyte comprises or consists essentially of a microemulsion, wherein the microemulsion comprises a calcium salt.

In a further aspect of the present invention, there is provided a redox flow battery comprising an electrolyte, wherein the electrolyte comprises or consists essentially of a microemulsion. In an example, the electrolyte may be an anolyte, a catholyte, or both.

In a further aspect of the present invention, there is provided a supercapacitor comprising an electrolyte, wherein the electrolyte comprises or consists essentially of a microemulsion.

In an example, the electrochemical cell comprises electrodes which have a substantially hydrophobic or lipophilic surface in contact with (or configured to contact) the microemulsion. Preferred examples of substantially hydrophobic or lipophilic surfaces include glassy carbon and graphite surfaces. In an example, the anode has a substantially hydrophobic or lipophilic surface in contact with (or configured to contact) the microemulsion. In another example, the cathode has a substantially hydrophobic or lipophilic surface in contact with (or configured to contact) the microemulsion.

The electrochemical cell may include a current collector. Preferred current collectors comprise a substantially hydrophobic or lipophilic surface which is in contact with or configured to contact the microemulsion. Preferred examples of substantially hydrophobic or lipophilic surfaces include glassy carbon and graphite surfaces.

The electrochemical cell may be positioned within a housing. For example, the housing may contain components including the microemulsion electrolyte composition, electrodes, and, optionally, the ion permeable separator (e.g. located between the anodic and cathodic electrodes).

In a further aspect of the present invention, there is provided an electrolyte composition when used in an electrochemical cell, wherein the electrolyte composition comprises or consists essentially of a microemulsion. The microemulsion comprises an aqueous phase and a water-immiscible phase.

The electrochemical cell may be selected from an ion battery, a supercapacitor, an electrolytic cell and a flow battery. The ion battery may be selected from a lithium ion battery, a magnesium ion battery, a calcium battery, an aluminium ion battery, and a sodium ion battery. The flow battery may be a redox flow battery.

In a further aspect of the present invention, there is provided a use of a microemulsion in an electrochemical cell wherein the microemulsion comprises an aqueous phase and a water-immiscible phase.

In a further aspect of the present invention, there is provided a microemulsion when used as an electrolyte for an electrochemical cell wherein the microemulsion comprises an aqueous phase and a water-immiscible phase.

In a further aspect of the present invention, there is provided an electrolyte composition when used in a redox flow battery, wherein the electrolyte composition comprises or consists essentially of a microemulsion, wherein the microemulsion comprises an aqueous phase and a water-immiscible phase.

In a further aspect of the present invention, there is provided an electrolyte composition when used in a sodium ion battery, wherein the electrolyte composition comprises or consists essentially of a microemulsion, wherein the microemulsion comprises an aqueous phase and a water-immiscible phase.

In a further aspect of the present invention, there is provided an electrolyte composition when used in a lithium ion battery, wherein the electrolyte composition comprises or consists essentially of a microemulsion, wherein the microemulsion comprises an aqueous phase and a water-immiscible phase.

In a further aspect of the present invention, there is provided an electrolyte composition when used in a magnesium ion battery, wherein the electrolyte composition comprises or consists essentially of a microemulsion, wherein the microemulsion comprises an aqueous phase and a water-immiscible phase.

In a further aspect of the present invention, there is provided an electrolyte composition when used in an aluminium ion, wherein the electrolyte composition comprises or consists essentially of a microemulsion, wherein the microemulsion comprises an aqueous phase and a water-immiscible phase.

In a preferred embodiment, the ion batteries described herein further comprise a phase transfer catalyst.

In a further aspect of the present invention, there is provided an electrolyte composition when used in a supercapacitor, wherein the electrolyte composition comprises or consists essentially of a microemulsion, wherein the microemulsion comprises an aqueous phase and a water-immiscible phase.

In a further aspect of the present invention, there is provided use of a microemulsion in an electrochemical cell, wherein the microemulsion increases the electrochemical cell's electrochemical window above 1.23 V, wherein the microemulsion comprises an aqueous phase and a water-immiscible phase.

In a further aspect of the present invention, there is provided a microemulsion when used in an electrochemical cell to increase the electrochemical cell's electrochemical stability window above 1.23 V, wherein the microemulsion comprises an aqueous phase and a water-immiscible phase.

In an example of the foregoing uses of the present invention, the aqueous phase is a continuous phase. The water-immiscible phase may be dispersed in a continuous aqueous phase or alternatively, the microemulsion may be a bicontinuous microemulsion such that the water-immiscible phase and the aqueous phase are both continuous phases.

In a preferred embodiment, the microemulsion is an oil-in-water microemulsion or a bicontinuous microemulsion.

In a further aspect of the present invention, there is provided a method of improving the conductivity of an organic electrolyte for an electrochemical cell, comprising the step of combining the organic electrolyte with an aqueous phase and converting the organic electrolyte into a microemulsion, wherein the microemulsion comprises an aqueous phase and a water-immiscible phase.

In a further aspect of the present invention, there is provided a method of increasing the electrochemical stability window of an aqueous electrolyte for an electrochemical cell, comprising the step of combining the aqueous electrolyte with an organic solvent and converting the aqueous electrolyte into a microemulsion, wherein the microemulsion comprises an aqueous phase and a water-immiscible phase.

In a further aspect of the invention, there is provided a method for increasing an electrochemical window in an electrochemical cell above 1.23 V, the method comprising combining an aqueous phase and a water-immiscible phase to provide a microemulsion, wherein the microemulsion comprises an aqueous phase and a water-immiscible phase.

In a further aspect of the present invention, there is provided a method for using an electrochemical cell of the present invention comprising connecting the electrochemical cell comprising the microemulsion electrolyte composition of the present invention to a load and supplying a charge to the load.

In an example of the foregoing methods of the present invention, the aqueous phase is a continuous phase. The water-immiscible phase may be dispersed in a continuous aqueous phase or alternatively, the microemulsion may be a bicontinuous microemulsion such that the water-immiscible phase and the aqueous phase are both continuous phases.

In a preferred embodiment, the microemulsion is an oil-in-water microemulsion or a bicontinuous microemulsion.

BRIEF DESCRIPTION OF THE FIGURES

FIG. 7 is a cyclic voltammogram of ME10, scan speed 100 mV·s$^{-1}$.

FIG. 8 is a cyclic voltammogram of ME11, scan speed 100 mV·s$^{-1}$.

DEFINITIONS

Figure 1:
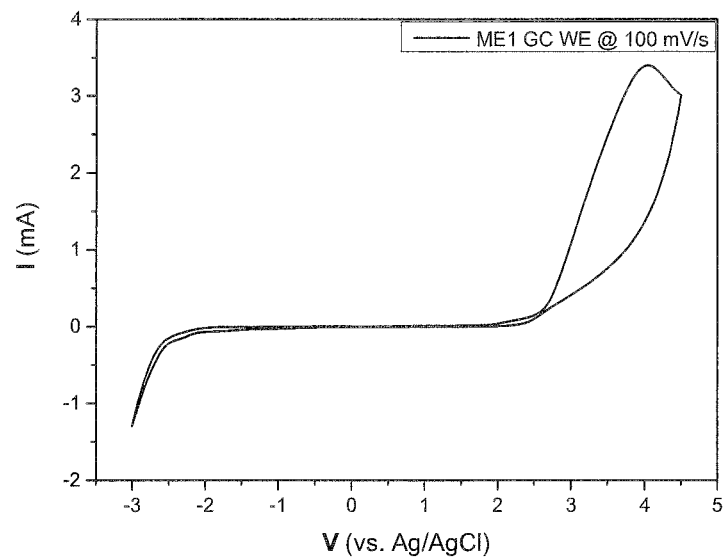
FIG. 1 is a cyclic voltammogram of ME1, scan speed 100 mV·s$^{-1}$.
Figure 2:
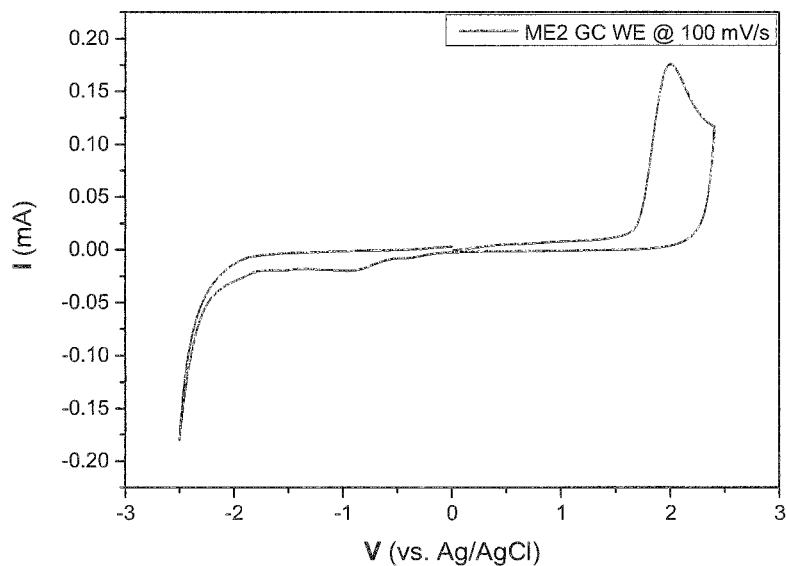
FIG. 2 is a cyclic voltammogram of ME2, scan speed 100 mV·s$^{-1}$.
Figure 3:
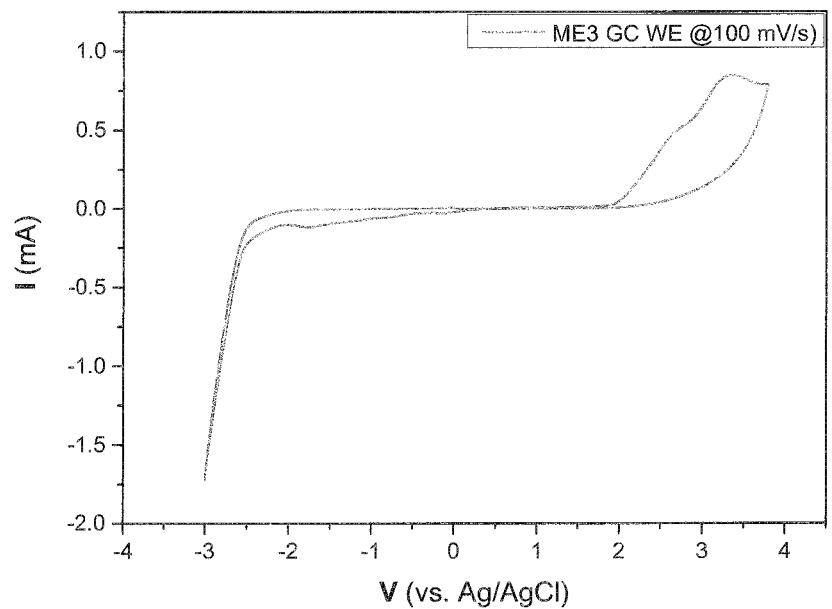
FIG. 3 is a cyclic voltammogram of ME3, scan speed 100 mV·s$^{-1}$.
Figure 4:
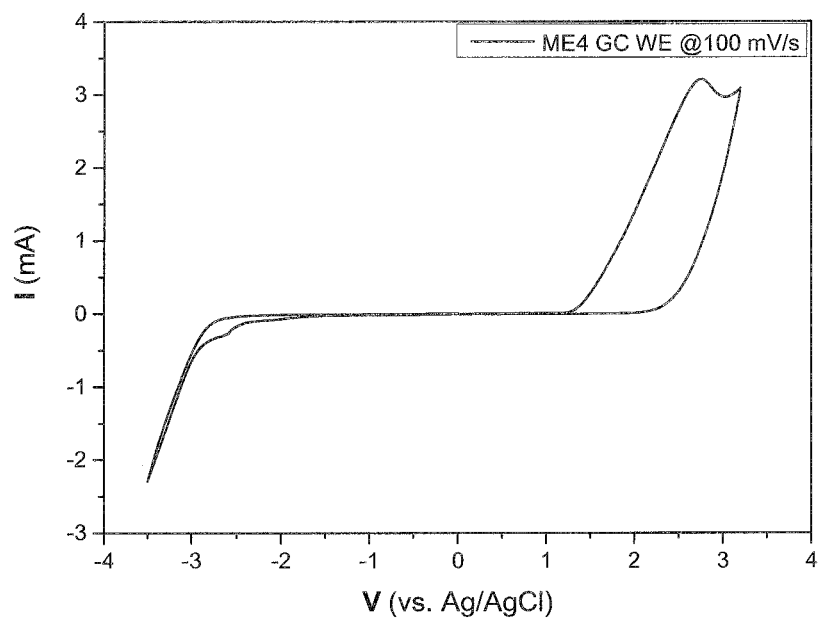
FIG. 4 is a cyclic voltammogram of ME4, scan speed 100 mV·s$^{-1}$.
Figure 5:
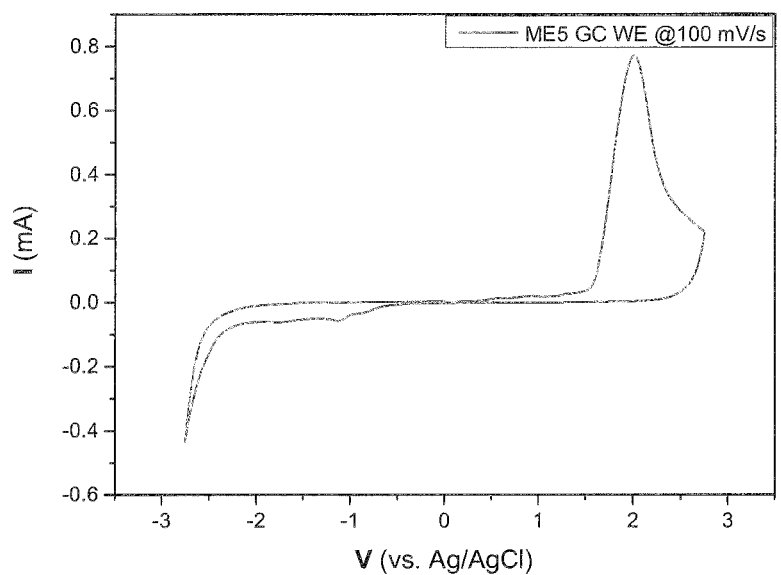
FIG. 5 is a cyclic voltammogram of ME5, scan speed 100 mV·s$^{-1}$.
Figure 6:
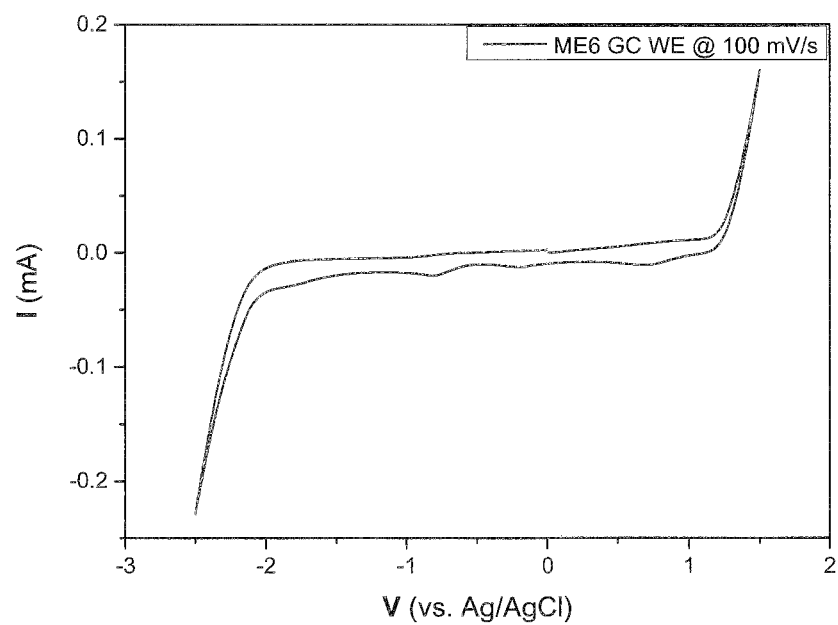
FIG. 6 is a cyclic voltammogram of ME6, scan speed 100 mV·s$^{-1}$.
Figure 9:
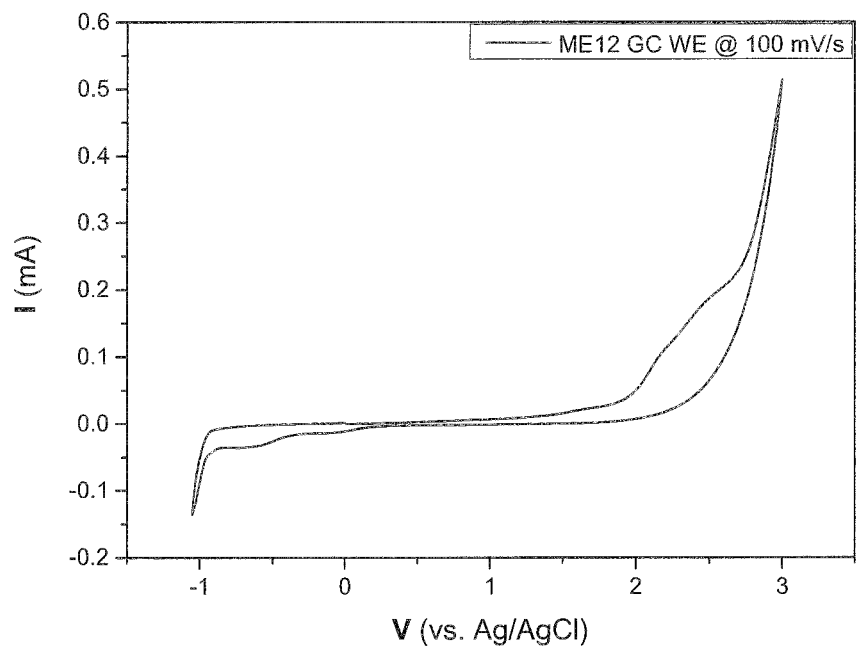
FIG. 9 is a cyclic voltammogram of ME12, scan speed 100 mV·s$^{-1}$.
Figure 10:
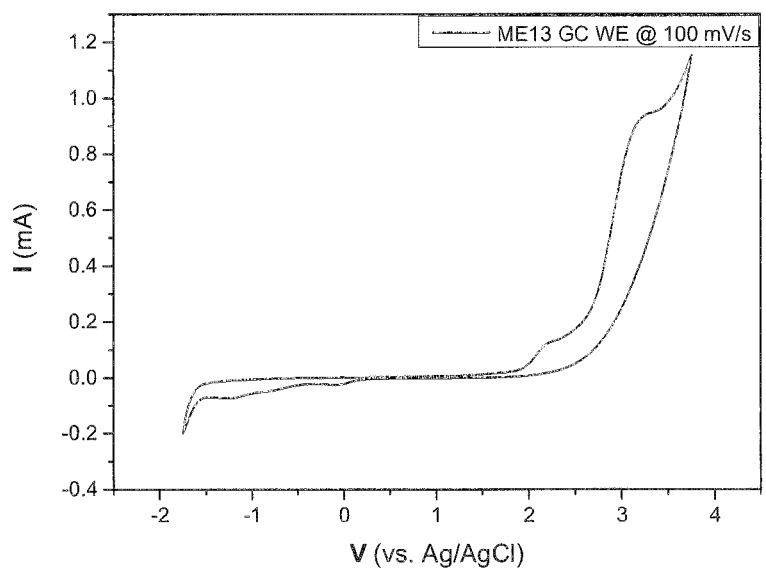
FIG. 10 is a cyclic voltammogram of ME13, scan speed 100 mV·s$^{-1}$.
Figure 11:
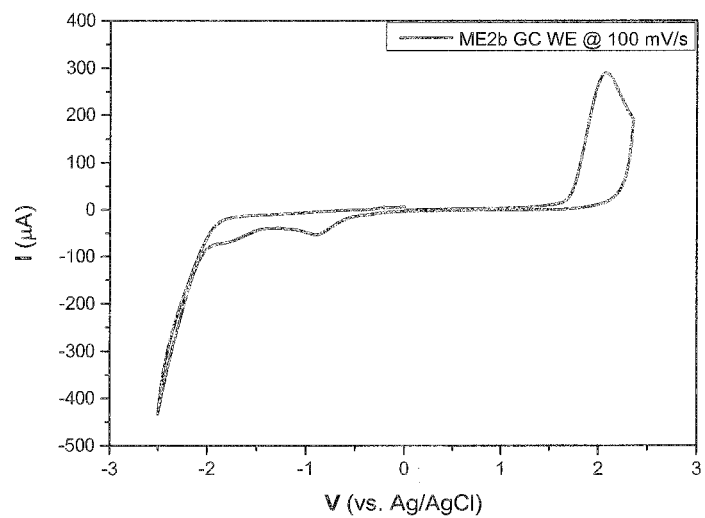
FIG. 11 is a cyclic voltammogram of ME2b, scan speed 100 mV·s$^{-1}$.

Unless specifically defined otherwise, all technical and scientific terms used herein shall be taken to have the same meaning as commonly understood by one of ordinary skill in the art (for example, in materials science and chemistry).

It is intended that reference to a range of numbers disclosed herein (e.g. 1 to 10) also incorporates reference to all related numbers within that range (e.g. 1, 1.1, 2, 3, 3.9, 4, 5, 6, 6.5, 7, 8, 9 and 10) and also any range of rational numbers within that range (for example 2 to 8, 1.5 to 5.5 and 3.1 to 4.7) and, therefore, all sub-ranges of all ranges expressly disclosed herein are expressly disclosed. These are only examples of what is specifically intended and all possible combinations of numerical values between the lowest value and the highest value enumerated are to be considered to be expressly stated in this application in a similar manner.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps i.e. including but limited only to.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The term "cyclic voltammetry" refers to a type of potentiodynamic electrochemical measurement. To obtain a cyclic voltammogram, the voltage is varied in a solution and the change in current is measured with respect to the change in voltage. It is a specific type of voltammetry used for studying the redox properties of chemicals and interfacial structures.

The term "electrochemical window" or "electrochemical stability window" of an electrolyte refers to the voltage range between which the electrolyte is not substantially oxidised or reduced. For example, the electrochemical stability window of water is the difference between the potential at which water is reduced to hydrogen ($H_2$), and at which water is oxidised to oxygen ($O_2$). Electrochemical stability may be measured or described in terms of a cyclic voltammetry measurement, in which the electrochemical stability window is the potential difference between the onset potential (the potential at which the current begins to rise or fall) of each of the cathodic and anodic reactions The term "immiscible", with reference to two or more materials, means that a material will not dissolve or combine with another material. With reference to immiscible liquids in biphasic systems such as the microemulsions described herein, "immiscible" means that the liquids are insoluble with each other, or are so sparingly soluble in each other that for all practical purposes the liquids are conventionally considered to be insoluble with each other. When two immiscible liquids are combined in a system, it will form a biphasic system of immiscible liquids.

A microemulsion is a thermodynamically stable mixture of two immiscible liquid phases. Microemulsions can be "oil-in-water", "water-in-oil", or "bicontinuous"; these terms which define a microemulsion structure are well known in the art. In oil-in-water microemulsions, a water-immiscible phase is dispersed in a continuous aqueous phase. In water-in-oil microemulsions, an aqueous phase is dispersed in a continuous water-immiscible phase. In bicontinuous microemulsions, an aqueous phase and a water-immiscible phase are each interconnected and interspersed throughout the mixture.

In this specification, the terms "water" and "oil" (e.g. as used in reference to oil in water microemulsions and water in oil microemulsions) are understood to represent the aqueous phase and the water-immiscible phase. The term "water-immiscible phase" is used to describe any liquid that is immiscible with the aqueous phase. "Water phase" and "aqueous phase", as used herein, may be used interchangeably.

As used herein, the terms "active species" and "electrochemically active species" mean compounds (including charged compounds, neutral compounds, radicals and the like) that are reactants of an electrochemical reaction. The reactions of electrochemically active species are, at least in part, responsible for the generation of a charge which flows within an electrochemical cell and as a result are responsible for the generation of an electric current.

The term "redox active organic species" means an organic electrochemically active species that undergoes reduction or oxidation in an electrochemical reaction. The reaction of redox active organic species are, at least in part, responsible for the generation of a charge which flows within an electrochemical cell and as a result are responsible for the generation of an electric current. See, for example: J. Winsberg, T. Hagemann, T. Janoschka, M. D. Hager, U. S. Schubert, *Angew. Chem. Int. Ed.* 2017, 56, 686; P. Leung, F. C. Walsh et al., *Journal of Power Sources*, 2017, 360, 243-283; X. Wei, et al., *ACS Energy Lett.* 2017, 2, 9, 2187-2204.

DETAILED DESCRIPTION

The present invention is predicated, at least in part, on 1) the surprising discovery that microemulsions which comprise an aqueous phase have an electrochemical stability window which is greater than that of bulk water, i.e. greater than 1.23 V, and/or 2) the surprising discovery that microemulsions, in which redox reactions of electrochemically active species occur in the water-immiscible (and substantially non-conductive) phase, enhance charge conductivity such that the microemulsions are able to conduct charge to an electrode and generate an electrical current.

The inventors have further shown that the microemulsion electrolyte compositions of the present invention may be used as electrolytes in an electrochemical cell. The microemulsion electrolyte compositions are able to support electrochemical redox reactions which generate a potential difference of greater than 1.23 V.

Accordingly, the present invention relates to the new use and application of microemulsions as electrolytes for electrochemical cells, and, more specifically, electrochemical energy storage devices (EESDs). The present invention further relates to new microemulsion electrolyte compositions which are adapted for use, configured for use, useful, or suitable for use, in electrochemical cells.

Microemulsions have a micro-heterogeneous liquid biphasic structure, which, at the macroscopic level, appears homogenous. The aqueous and water-immiscible phases of the microemulsion are immiscible at the desired operating temperature (which is usually at or around room temperature). Microemulsions are thermodynamically stable, and therefore are able to form spontaneously (without application of energy), and do not separate out into their constituent phases over time once formed. Therefore, the electrochemical characteristics of microemulsions are also constant and persist over time. As described herein, microemulsions yield surprising electrochemical properties compared to the materials of each phase in their bulk state.

It should be emphasised that 'emulsions' or 'emulsified electrolytes' are very different to microemulsions, despite similar nomenclature. Emulsions are thermodynamically unstable (kinetically stable) mixtures of immiscible liquids. This means that, in contrast to microemulsions, the two immiscible phases of an emulsion will separate out over time.

The microemulsion electrolyte composition comprises an aqueous phase and a water-immiscible phase.

Preferably, the water-immiscible phase is dispersed in the aqueous phase, and the aqueous phase is a continuous phase (i.e. the microemulsion is an "oil-in-water" microemulsion). Alternatively, but still preferably, the water-immiscible phase and the aqueous phase are bicontinuous. In a less preferred embodiment, the microemulsion may be a water-in-oil microemulsion (i.e. the water-immiscible phase is a continuous phase and the aqueous phase is a dispersed phase).

Suitable solvents for the water-immiscible phase of the microemulsion electrolyte composition include a water-immiscible solvent or a combination of two or more water-immiscible solvents. Water-immiscible organic solvents, and mixtures thereof, are particularly suitable. By way of example only, a non-limiting list of solvents that are suitable for the water-immiscible phase of the microemulsion electrolyte compositions include aliphatic solvents (e.g. cyclic and non-cyclic, branched and non-branched alkanes, such as hexane, cyclohexane and petroleum ether, alkenes, alkynes); aromatic solvents (e.g. benzene, toluene, p-xylene, 1,2-dichlorobenzene); halogenated solvents (e.g. dichloromethane, chloroform, dichloroethane); ether solvents (e.g. diethyl ether, diphenyl ether); ketone solvents, such as acetophenone; esters, such as ethyl benzoate, ethyl acetate; or a combination thereof.

A preferred solvent for the aqueous phase of the microemulsion electrolyte composition is water. Alternative aqueous phases include combinations of water and water-miscible solvents, such as methanol and ethanol. Clearly, the aqueous phase of the microemulsion electrolyte composition must be immiscible with the water-immiscible phase.

The relative proportions of the aqueous phase and the water-immiscible phase in the microemulsion electrolyte composition are naturally limited by the overall thermodynamic stability of the mixture of components that make up the microemulsion electrolyte composition (e.g. aqueous phase, water-immiscible phase, and the presence of any other compounds such as amphiphiles, salts and electrochemically active species). There are natural limitations on the relative proportions of each phase in which it is thermodynamically favourable for the composition to exist as a microemulsion. There are further natural limitations on the relative proportions of each phase to achieve an oil-in-water microemulsion or a bicontinuous microemulsion. The relative proportions of each phase may be determined theoretically, or by routine experimentation by a person skilled in the art.

For the microemulsion electrolyte compositions of the present invention, the relative proportions of the aqueous phase and water-immiscible phase include any and all proportions and ranges thereof in which a microemulsion is formed. As oil-in-water and bicontinuous microemulsion systems are preferred, the preferred proportions of the aqueous phase and water immiscible phase are those that yield oil-in-water and bicontinuous microemulsions.

A factor for determining preferred relative proportions of the aqueous phase and water-immiscible phase is an aim of maximising the concentration of the dissolved electrochemically active species. Where the electrochemically active species is dissolved in the water-immiscible phase, maximising the proportion of water-immiscible phase in the microemulsion electrolyte composition will maximise the concentration of active species in the composition, and thereby maximise energy density. Similarly, where the active species are dissolved in the aqueous phase, maximising the proportion of the aqueous phase in the microemulsion electrolyte composition will maximise the concentration of active species.

In some embodiments, the microemulsion electrolyte composition comprises between about 1% and 99% water by weight of the microemulsion, more preferably between about 10% and 99% water by weight of the microemulsion, more preferably between about 20% and 99% water by weight of the microemulsion.

Microemulsion electrolyte compositions may be prepared with a high water content or with a low water content.

For microemulsions with higher proportion of aqueous phase (i.e. greater than about 75% by weight), and low proportion of water-immiscible phase (i.e. less than about 10% by weight) the electrochemical stability window is significantly greater than bulk water, and enables electrochemical reactions with potentials beyond the electrochemical stability window of an aqueous environment.

For microemulsions with lower water content (i.e. less than about 50% by weight), these microemulsions are particularly useful in electrochemical cells where the electrochemically active species are dissolved in the water-immiscible phase. Microemulsion electrolyte compositions with low water content are desirably not water-in-oil compositions, and are more preferably either bicontinuous or oil-in-water (where feasible). Water-in-oil microemulsions that have been tested by the inventors have low conductivity, or are non-conductive, and are therefore unsuitable as electrolyte compositions for electrochemical cells.

In embodiments where the microemulsion electrolyte composition comprises an oil-in-water microemulsion, the microemulsion electrolyte composition preferably comprises between about 80% and about 99% water by weight of the composition.

In embodiments where the microemulsion electrolyte composition comprises a bicontinuous microemulsion, the microemulsion electrolyte composition preferably comprises between about 20% and about 80% water by weight of the composition.

Another factor for determining preferred relative proportions of the aqueous phase and water-immiscible phase is the aim of maximising charge conductivity. Conductivity of the microemulsion electrolyte composition is predominantly provided by the aqueous phase, and therefore microemulsion electrolyte compositions in which the aqueous phase is a continuous phase (i.e. oil-in-water and bicontinuous microemulsions) are preferred.

The conductivity of the aqueous phase enables electrochemical redox reactions to take place in substantially non-conductive water-immiscible phases. For example, where the water-immiscible phase is an organic solvents such as an aliphatic or aromatic solvent, the water-immiscible phase of the microemulsion electrolyte compositions is substantially non-conductive. The electrochemical redox reaction that is observed to occur within the water-immiscible phase (see, for example, Example 4 below) is facilitated by the conductivity of the aqueous phase.

The aqueous phase may further comprise added dissolved salts to provide ions for the electrolyte composition. The dissolved salts may be selected from the group including Group 1 salts, Group 2 salts, transition metal salts, aluminium salts, or a combination thereof. Examples of dissolved salts include but are not limited to LiCl, NaCl, KCl, LiOH, NaOH, KOH, MgSO$_4$, MgCl$_2$, Zn(NO$_3$)$_2$, and AlCl$_3$. The aqueous phase may include dissolved Group 1 ions, Group 2 ions, transition metal ions, aluminium ions, or a combination thereof. Examples of dissolved ions include lithium, sodium, potassium, magnesium, aluminium, calcium, chromium, manganese, iron, cobalt, copper, nickel, zinc, silver, halogen ions (e.g. fluorides, chlorides, chlorates, bromides, bromates, iodides, iodates), sulfate ions, nitrate ions, and a combination thereof. The concentration of dissolved ions in the aqueous phase may be between 0% and a saturated aqueous solution. The dissolved ions may contribute towards the conductivity of the microemulsion electrolyte composition, so the concentration of dissolved ions may be as high as possible. Exemplary ranges of dissolved ions include between 0 and 10 M, more preferably between about 0.01 M and 5 M, more preferably between 0.05 M and 1 M, most preferably between about 0.05 M and 0.5 M.

The conductivities of the oil-in-water and bicontinuous microemulsion electrolyte compositions shown in the Examples of the present invention are between 3 and 8 mS·cm$^{-1}$. It will be appreciated by those skilled in the art that the conductivity of the microemulsion electrolyte compositions may be increased beyond what has been specifically exemplified. The conductivity of the microemulsion electrolyte composition may be increased by adding additional charged species (such as by dissolving salts), which will be solubilised by the aqueous phase of the electrolyte composition. The salts may be added to the microemulsion electrolyte composition once it is already formed, or may be added to the aqueous component prior to preparation of the microemulsion electrolyte composition.

The microemulsion electrolyte composition should be sufficiently conductive to permit the flow of electric current through the electrolyte. The microemulsion electrolyte composition preferably has a conductivity of more than 0.1 mS·cm$^{-1}$, preferably more than 1 mS·cm$^{-1}$, preferably more than 3 mS·cm$^{-1}$, preferably more than 5 mS·cm$^{-1}$, or between 0.1 and 12 mS·cm$^{-1}$, preferably between 1 and 12 mS·cm$^{-1}$, preferably between 3 and 10 mS·cm$^{-1}$.

The microemulsion may include one or more amphiphiles. The amphiphile may be a surfactant, co-surfactant or a co-solvent. Suitable surfactants and co-surfactants for the preparation of microemulsion electrolyte compositions and will be known in the art. Examples of suitable surfactants include anionic surfactants, cationic surfactants, zwitterionic surfactants and non-ionic surfactants. Examples of preferred surfactants include Triton X-100, cetyltrimethylammonium chloride (CTAC), cetylpyridinium chloride (CPC), benzalkonium chloride, benzethonium chloride, sodium dodecyl sulfate (SDS), and sodium lauryl ether sulfate (SLES). Examples of suitable co-surfactants or co-solvents include aliphatic alcohols, such as C2-C6 alcohols, and amines, such as C2-C6 alkyl amines. Preferred co-surfactants and/or co-solvents for the present invention include ethanol, propanol, butanol and pentanol.

The microemulsion electrolyte composition may include, or be adapted to include, dissolved electrochemically active species. The reactions of the electrochemically active species in an electrochemical cell generate a flow of charge and as a result generate an electric current. In particular, the microemulsion electrolyte composition may include redox active organic species.

As the microemulsion electrolyte compositions comprise aqueous and water-immiscible phases, the compositions are able to dissolve electrochemically active species and redox active organic species across a wide range of polarities and solubilities. The compositions may comprise electrochemically active species that are soluble in the aqueous phase, the water-immiscible phase, or both. Examples of electrochemically active species that may be dissolved in the microemulsion electrolyte compositions include salts (organic and inorganic), neutral organic molecules, stable organic radicals, oil-soluble metal-based compounds, organometallic compounds. Specific examples of redox active organic species that may be dissolved in the microemulsion include: ferrocene, (2,2,6,6-tetramethylpiperidin-1-yl)oxyl (TEMPO), phenothiazines, dimethoxybenzene, menadione and 2,1,3-benzothiadiazole. Where the microemulsion electrolyte composition is used in electrochemical cells, in particular for redox flow batteries, the concentration of redox-active species in the composition is preferably maximised. For electrochemically active species that are insoluble in water or an aqueous solution, a water-immiscible phase solvent in which the electrochemically active species is soluble is selected.

For example, the inventors have performed electrochemical reactions in redox flow battery using ferrocene in a microemulsion electrolyte composition (see Example 4 and FIGS. 13 to 23). Ferrocene is insoluble in water, indicating that the electrochemical reactions of ferrocene occur in the water-immiscible phase of the microemulsion electrolyte composition. This shows that the microemulsion electrolyte composition can solubilise organic (including organometallic) components which are not soluble in aqueous solvents, and that such components can co-exist in the same electrolyte composition as polar and ionic components.

The microemulsion electrolyte compositions have an electrochemical stability window that is greater than that of bulk water (1.23 V). Preferably, the electrochemical stability window of the microemulsion electrolyte composition is greater than 1.5 V, preferably greater than 2 V, preferably greater than 2.5 V, preferably greater than 3 V, preferably greater than 3.5 V, preferably greater than 4 V.

Preferably, in an experiment using a glassy carbon working electrode, a platinum counter electrode and a Ag/AgCl reference electrode, at room temperature and sea-level pressure, the microemulsion electrolyte composition is stable (i.e. not degrading) at voltages more negative than −0.25 V, more preferably more negative than −0.5 V, more preferably more negative than −1 V, more preferably more negative than −1.5 V, and most preferably more negative than −2 V. The microemulsion electrolyte composition is also preferably stable (i.e. not degrading) at positive voltages greater than 1.25 V, more preferably greater than 1.5 V, more preferably greater than 2 V, and more preferably greater than 2.25 V.

It is preferable that the water-immiscible phase of the microemulsion electrolyte composition does not degrade in use. In particular, it is preferable that the water-immiscible phase is stable and/or does not electrochemically degrade in use, for example, it is preferable that the water-immiscible phase is stable at potentials between −2 V and +2.5 V (Ag/AgCl reference electrode, ambient temperature at sea level). Preferably, the electrochemical stability window of the water-immiscible phase is greater than 1.5 V, preferably greater than 2 V, preferably greater than 2.5 V, preferably greater than 3 V, preferably greater than 3.5 V, preferably greater than 4 V. Similarly, it is preferable that any amphiphile present in the microemulsion does not degrade in use. In particular, it is preferable that the amphiphile is stable and/or does not electrochemically degrade in use, for example, it is preferable that the amphiphile is stable at potentials between −2 V and +2.5 V (Ag/AgCl reference electrode, ambient temperature at sea level).

From the foregoing description, it will be clear that the amounts of each component in the microemulsion electrolyte compositions (e.g. aqueous phase, water-immiscible phase, salts, amphiphiles, and electrochemically active species) may be configured or adjusted to optimise parameters such as the conductivity of the compositions, the electrochemical stability window of the compositions and the solubility of the electrochemically active species. Such optimisations would be a matter of routine experimentation and are within the scope of this invention.

In a further aspect, there is provided an electrochemical cell, such as a battery cell, comprising the microemulsion electrolyte composition of the present invention.

In preferred embodiments, the electrochemical cell comprises electrodes which have a substantially hydrophobic or lipophilic surface in contact with the microemulsion electrolyte composition. Examples of hydrophobic or lipophilic electrodes include carbon electrodes, such as glassy carbon and graphite electrodes. The surface of non-hydrophobic or non-lipophilic electrodes may be treated such that the surface becomes hydrophobic or lipophilic. Suitable electrodes having these features would be familiar to those of skill in the art.

The electrochemical cell may be suitable for any type of battery. The electrochemical cell may be an ion battery, or a flow battery. Preferably, the electrochemical cell may be a lithium ion battery, a magnesium ion battery, a sodium ion battery, an aluminium ion battery, or a redox flow battery.

Where the electrochemical cell is a flow battery, or redox flow battery, the microemulsion electrolyte composition may be used as an anolyte, catholyte or both. The microemulsion electrolyte compositions for anolyte and catholyte may be configured to optimise parameters such as conductivity of the compositions, electrochemical stability window of the compositions and the solubility of the electrochemically active species. Therefore, the anolyte and catholyte may comprise microemulsion electrolyte compositions having substantially the same formulations (except for the identity of the electrochemically active species), or the anolyte and catholyte may comprise different formulations.

The microemulsion electrolyte compositions of the present invention may be prepared according to known methods of preparing microemulsions that are familiar to those skilled in the art. The microemulsions of the present invention may be prepared by the combination of the individual components. As microemulsions are thermodynamically stable, they are able to form spontaneously. However, agitation of the microemulsion components may be performed so that the microemulsion forms in a suitably short amount of time. For example, the combined components may be agitated by stirring, shaking or sonication.

The microemulsions of the present invention may require amphiphiles, such as surfactants co-solvents and/or co-surfactants. Preferred amphiphiles are described above and a selection of amphiphiles are used in the Examples, but the invention is not limited to these specific compounds. As will be appreciated by those skilled in the art, the choice of amphiphile is dependent on the type of microemulsion desired (oil-in-water, bicontinuous or water-in-oil), and on the specific identities and proportions of the components in the microemulsion electrolyte composition.

The microemulsion electrolyte composition may be prepared in ambient conditions, and batteries comprising the microemulsion electrolyte composition may also be prepared in ambient conditions. That is, at room temperature and in the presence of ambient moisture, oxygen, carbon dioxide and other atmospheric constituents.

The microemulsion electrolyte compositions are useful as electrolytes in electrochemical cells including metal ion batteries, such as lithium ion batteries, magnesium ion batteries, sodium ion batteries, and aluminium ion batteries. The microemulsion electrolyte composition enables an operating potential of greater than 1.23 V, while still allowing for dissolution of the metal ions used in metal ion batteries.

The microemulsion electrolyte compositions are also useful as electrolytes in flow batteries, such as redox flow batteries. The microemulsion electrolyte compositions may be used as catholyte and/or anolyte.

Batteries may be prepared using the microemulsion electrolyte composition of the present invention in accordance with known methods. For example, a battery may be prepared using electrodes comprising graphite and/or vanadium pentoxide, current collectors of any type (such as steel), and a body of any suitable material, such as plastic or metal, and which would be readily apparent to those of skill in the art.

Ion batteries may be constructed in ambient conditions using the microemulsion electrolyte composition of the present invention. For example, a first current collector is placed into a body (e.g. a plastic cell). A first electrode is placed on top of the current collector with the active material of the electrode facing the interior. Glass microfiber filters are cut to size and then placed on top of the first electrode to act as a separator. For small batteries, between about 0.1 ml and about 1 ml of the electrolyte of the present invention is added on top of the glass microfiber before a second electrode is placed in the cell with its active material facing the interior of the cell. A second current collector is then placed on top of the second electrode. The components are secured and the cell is closed, for example by screwing the cell closed.

Flow batteries may similarly be constructed using the microemulsion electrolyte composition of the present invention. For example, the microemulsion electrolyte composition may be used as the catholyte and/or anolyte in a flow battery. Such catholyte and/or anolyte include dissolved electrochemically active species, such as redox active organic species. Activation of the flow battery causes the redox active organic species to react in the flow battery to generate a flow of charge and an electrical current.

Supercapacitors may similarly be constructed using the microemulsion electrolyte composition of the present invention. The supercapacitors comprise two high surface area electrodes (anodic and cathodic) in contact with the microemulsion electrolyte composition, typically separated by an ion permeable separator located between the two electrodes. The microemulsion electrolyte composition, in contact with the surface of the electrodes, forms an electrical double layer to store charge.

EXAMPLES

Example 1: Preparation of Electrolyte Compositions

Microemulsion samples were prepared according to the following method.

Each microemulsion sample comprised an aqueous component and a water-immiscible component, optionally a surfactant and/or optionally a co-surfactant. The components of each microemulsion sample are shown in Table 1.

The surfactant was weighed into an Erlenmeyer flask to which the water-immiscible component and co-surfactant were added. This mixture was stirred thoroughly to form a uniform slurry, and the aqueous component was then added. The mixture was turbid and white, which upon sonication in an ultrasonic bath or stirring, led to the formation of a clear microemulsion.

ME1 was prepared according to the method described in Menger, F. M. & Elrington, A. R. "Organic reactivity in microemulsion systems" J. Am. Chem. Soc. 113, 9621-9624 (1991), and the methods of preparing ME2, ME3, ME5, ME12 and ME13 were based on this disclosure. ME2b was prepared according to the method described in Lang, Djavanbakht, Zana, "Ultrasonic absorption study of microemulsions in ternary and pseudoternary systems", J. Phys. Chem., 1980, 84 (12), pp 1541-1547. ME6 was prepared according to the method described in Sun, B. et al. "A surfactant-free microemulsion consisting of water, ethanol, and dichloromethane and its template effect for silica synthesis" J. Colloid Interface Sci. 526, 9-17 (2018). ME10 was prepared according to the method described in Mukherjee, K., Mukherjee, D. C. & Moulik, S. P. "Thermodynamics of Microemulsion Formation" J. Colloid Interface Sci. 187, 327-333 (1997). ME11 was prepared according to the method described in Gorel, F. "Assessment of agar gel loaded with microemulsion for the cleaning of porous surfaces" CeROArt Conserv. Expo. Restaur. D'Objets D'Art (2010).

For the microemulsions with dissolved salts (e.g. ME6), the required amount of salt was weighed and added to the prepared microemulsion.

Example 2: Electrochemical Stability Window of Microemulsions

Cyclic voltammetry analysis of each sample was performed using a glassy carbon working electrode, a platinum counter electrode and a Ag/AgCl reference electrode, using a Metrohm Autolab PGSTAT302 potentiostat. A scan rate of 100 mV/s was used.

Voltammograms of each sample are shown in FIGS. 1 to 11.

The electrochemical stability window of each microemulsion sample was determined as the potential difference between the onset potential (the potential at which the current begins to rise or fall) of each of the cathodic and anodic reactions. The electrochemical stability window of each microemulsion electrolyte composition sample is shown in Table 1.

Figure 12:
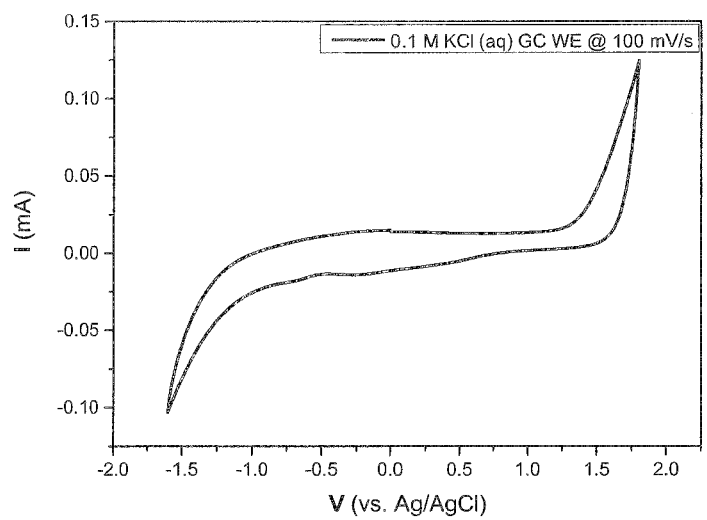
FIG. 12 is a cyclic voltammogram of 0.1 M aqueous solution of KCl, scan speed 100 mV·s$^{-1}$.
Figure 13:
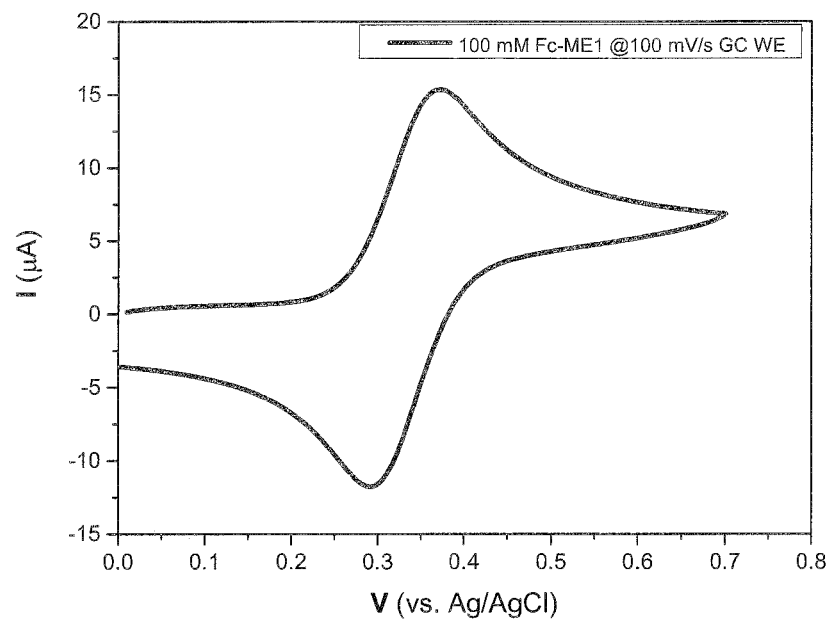
FIG. 13 is a cyclic voltammogram of ferrocene in ME1, scan speed 100 mV·s$^{-1}$.
Figure 14:
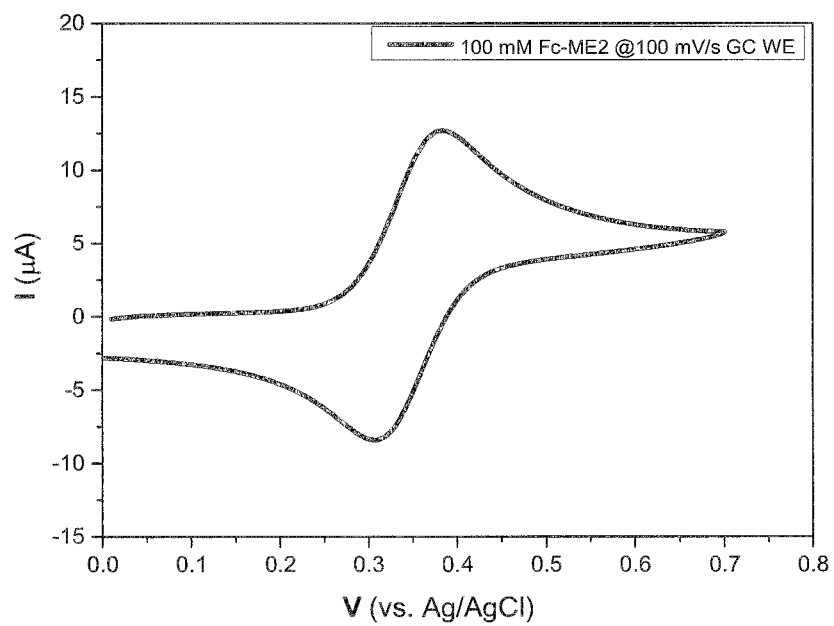
FIG. 14 is a cyclic voltammogram of ferrocene in ME2, scan speed 100 mV·s$^{-1}$.
Figure 15:
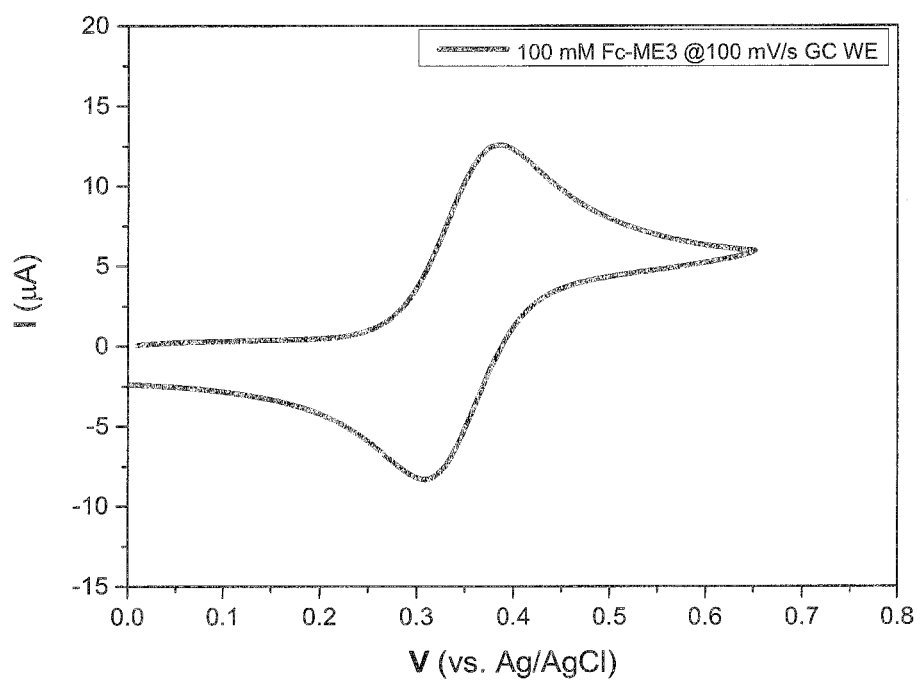
FIG. 15 is a cyclic voltammogram of ferrocene in ME3, scan speed 100 mV·s$^{-1}$.
Figure 16:
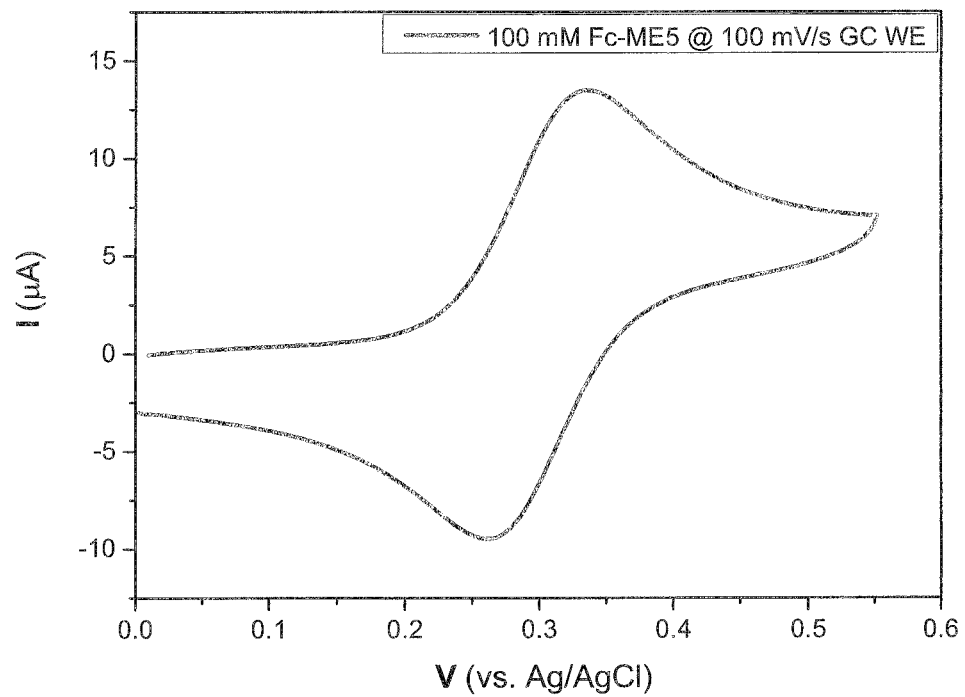
FIG. 16 is a cyclic voltammogram of ferrocene in ME4, scan speed 100 mV·s$^{-1}$.
Figure 17:
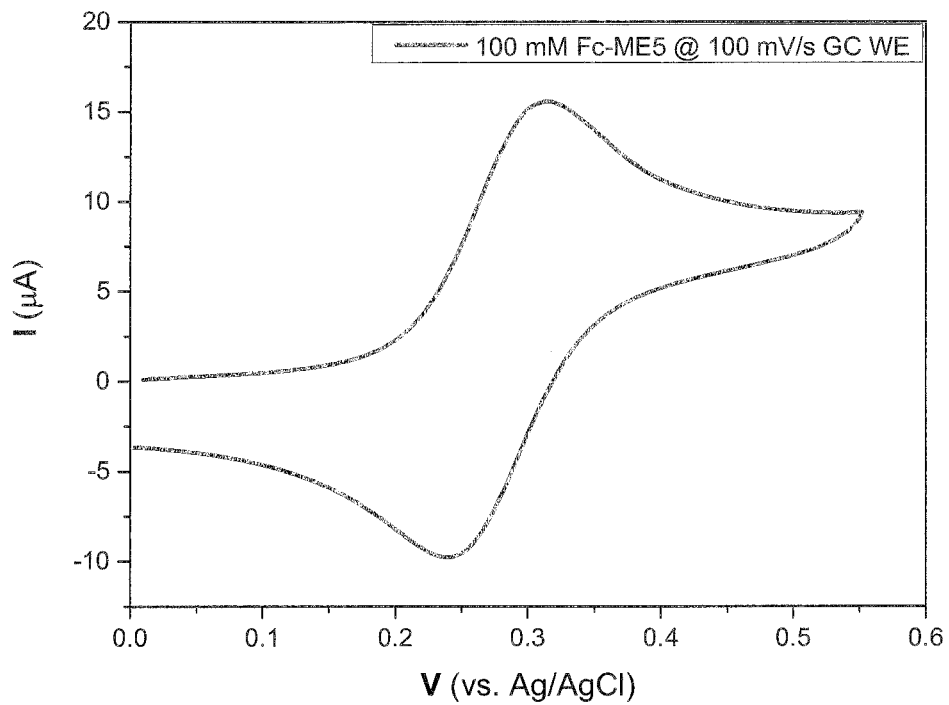
FIG. 17 is a cyclic voltammogram of ferrocene in ME5, scan speed 100 mV·s$^{-1}$.
Figure 18:
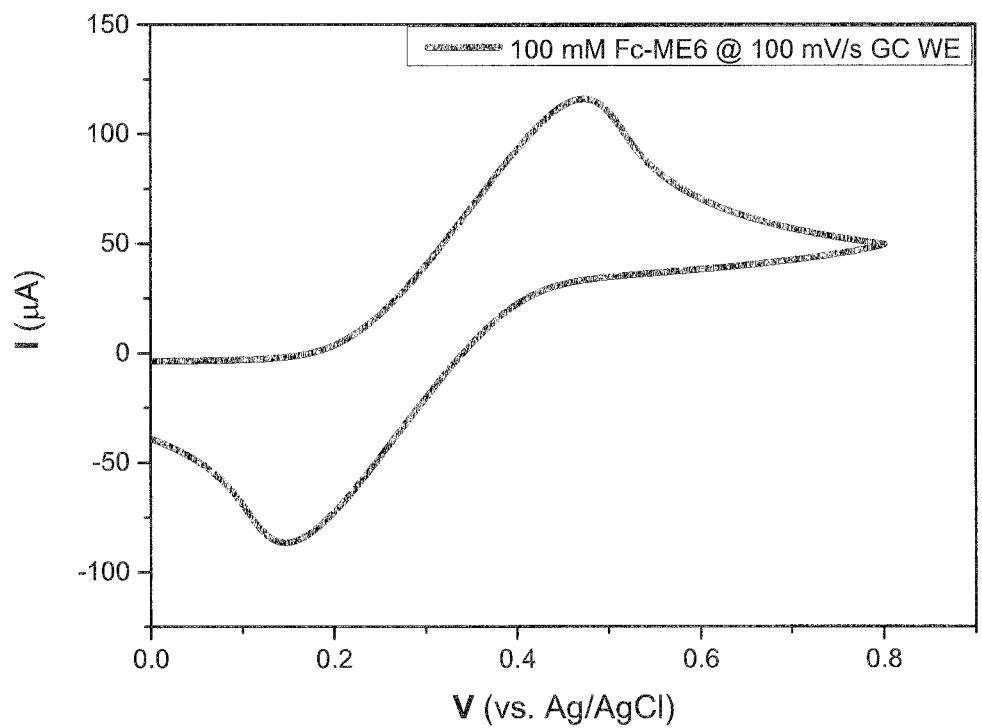
FIG. 18 is a cyclic voltammogram of ferrocene in ME6, scan speed 100 mV·s$^{-1}$.
Figure 19:
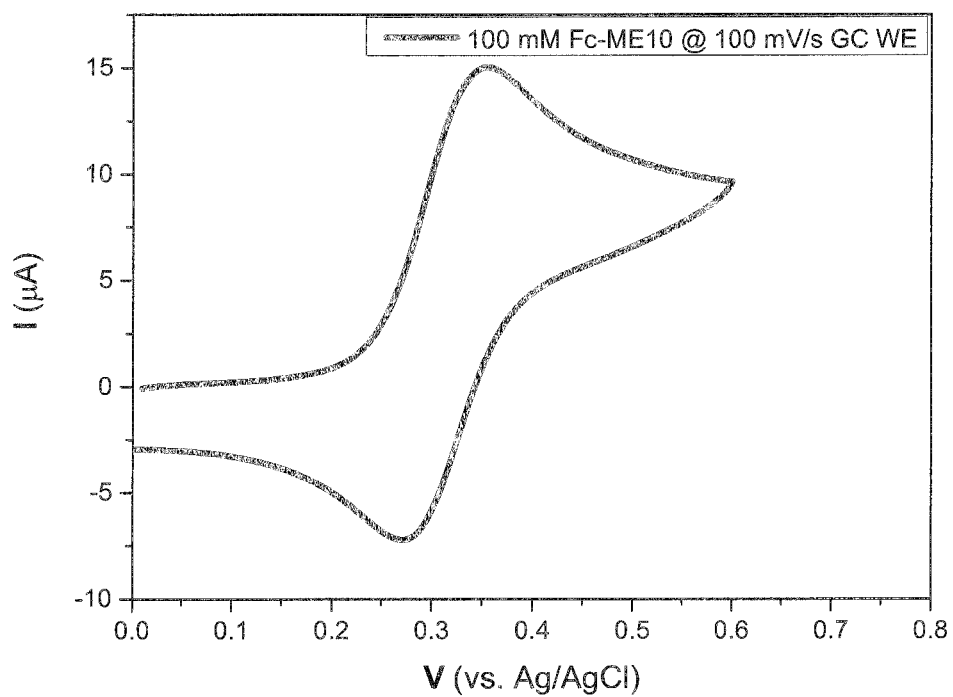
FIG. 19 is a cyclic voltammogram of ferrocene in ME10, scan speed 100 mV·s$^{-1}$.
Figure 20:
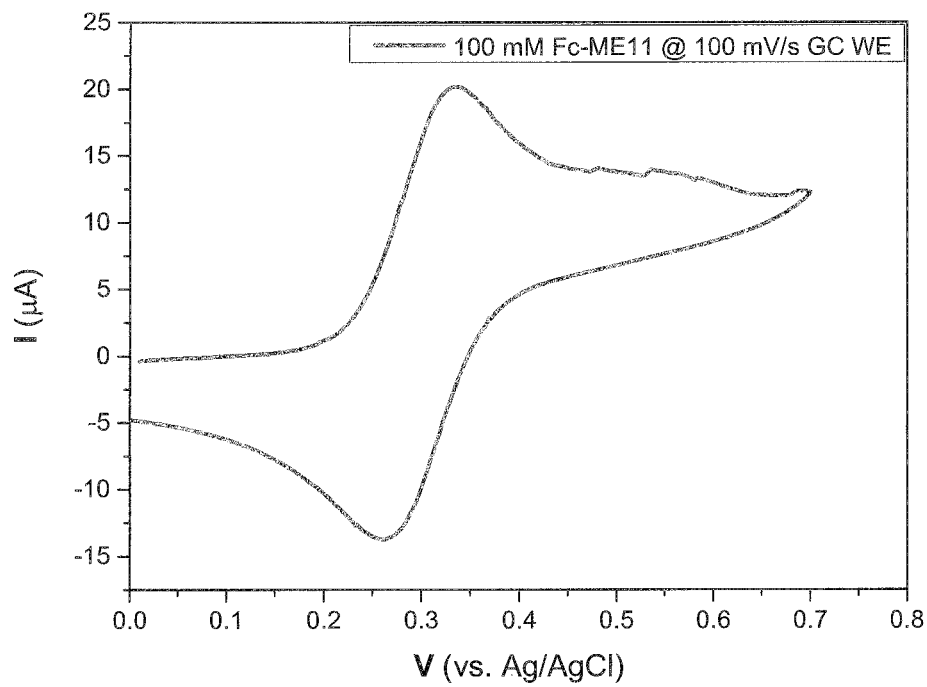
FIG. 20 is a cyclic voltammogram of ferrocene in ME11, scan speed 100 mV·s$^{-1}$.
Figure 21:
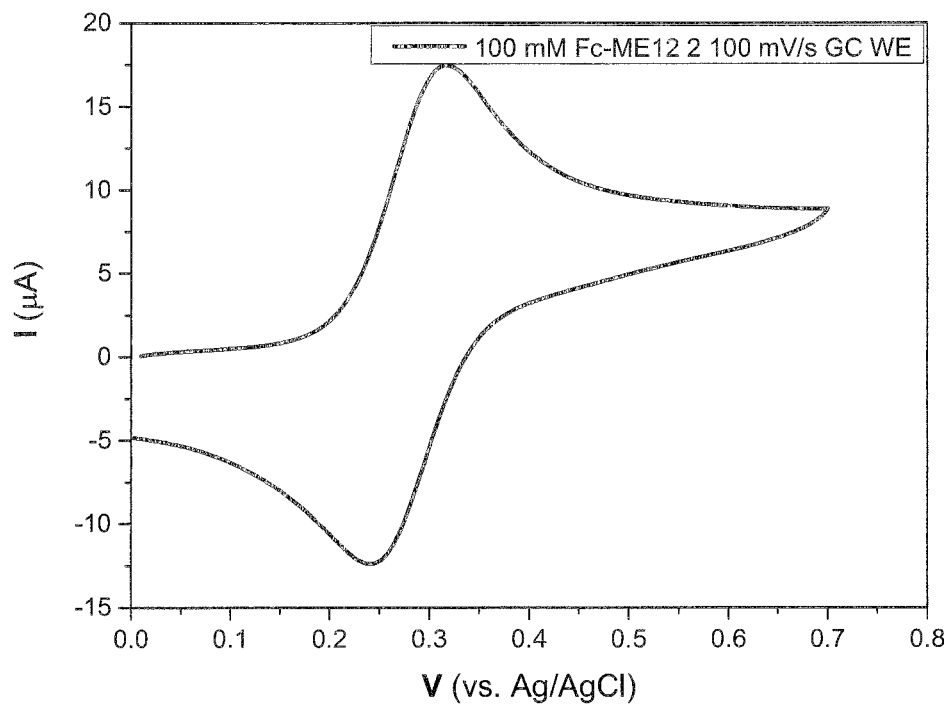
FIG. 21 is a cyclic voltammogram of ferrocene in ME12, scan speed 100 mV·s$^{-1}$.
Figure 22:
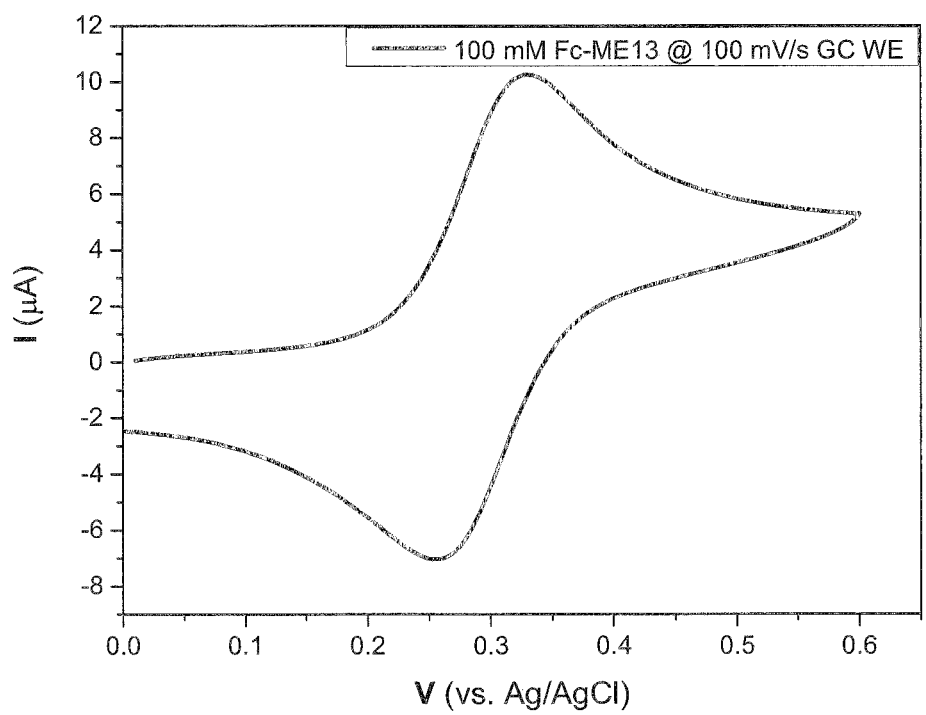
FIG. 22 is a cyclic voltammogram of ferrocene in ME13, scan speed 100 mV·s$^{-1}$.
Figure 23:
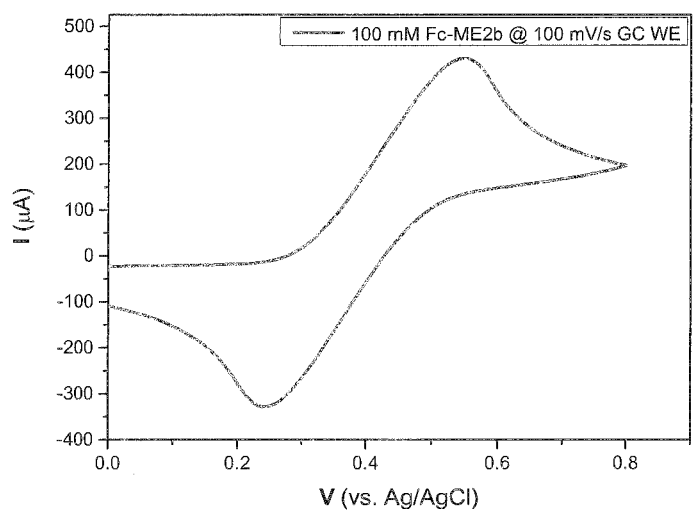
FIG. 23 is a cyclic voltammogram of ferrocene in ME2b, scan speed 100 mV·s$^{-1}$.
Figure 24:
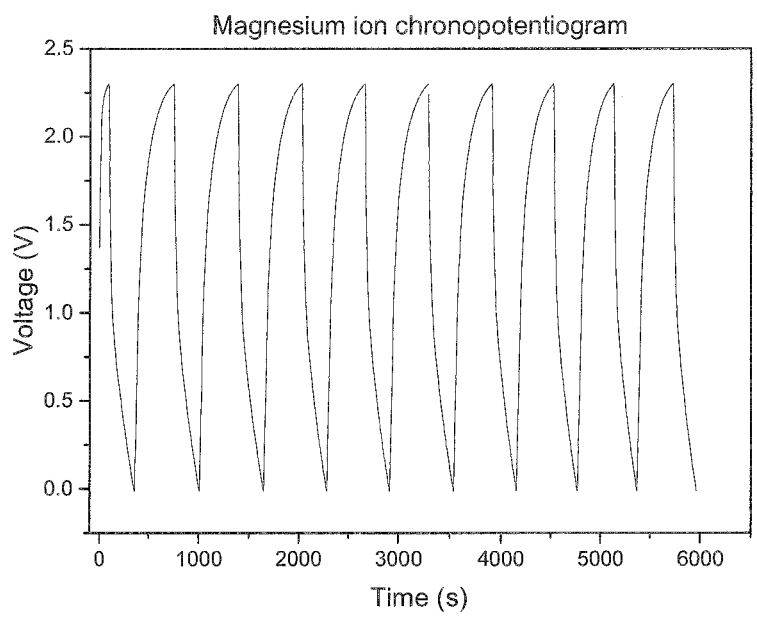
FIG. 24 is a chronopotentiogram of a magnesium ion battery comprising 0.5 mol·dm$^{-3}$ MgSO$_4$ in ME1.
Figure 25:
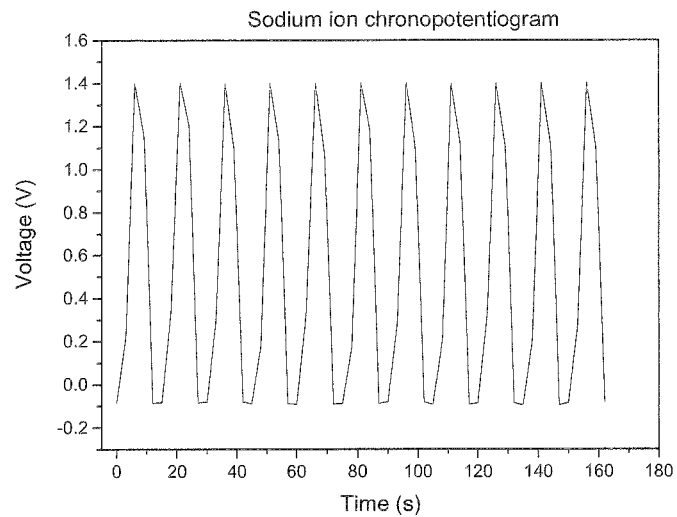
FIG. 25 is a chronopotentiogram of a sodium ion battery comprising 0.1 mol·dm$^{-3}$ NaCl in ME2.
Figure 26:
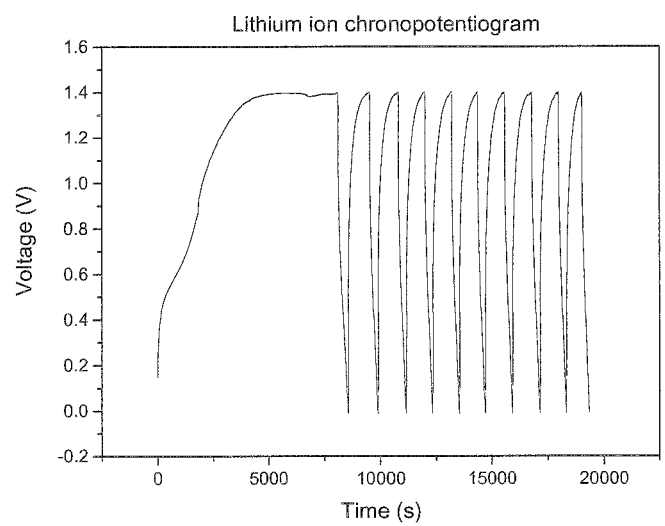
FIG. 26 is a chronopotentiogram of a lithium ion battery comprising 0.1 mol·dm$^{-3}$ LiCl in ME2.
Figure 27:
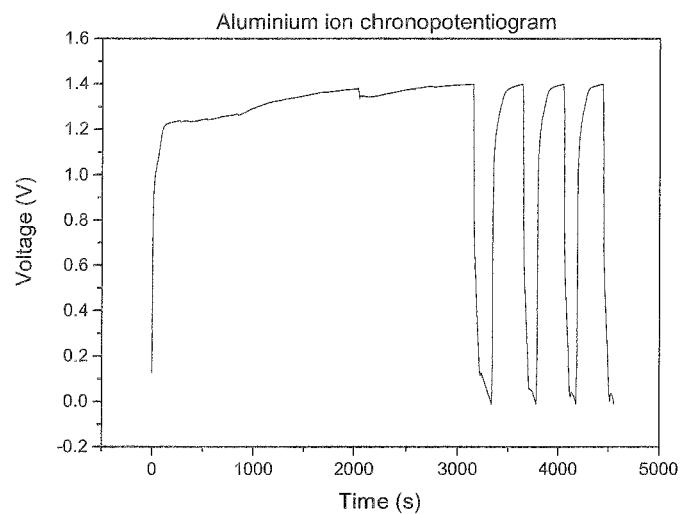
FIG. 27 is a chronopotentiogram of an aluminium ion battery comprising 0.1 mol·dm$^{-3}$ AlCl$_3$ in ME2.

FIG. 12 shows a cyclic voltammogram of a 0.1 M aq. KCl solution, having an onset potential (potential at which the current starts to rise or fall) for $O_2$ evolution at ~1.25V vs. Ag/AgCl and an onset potential for $H_2$ evolution at ~-1V vs. Ag/AgCl. Most of the microemulsions (except for ME6 and ME10) show an onset potential for $O_2$ evolution higher than 1.25V, depending on the microemulsion composition. The onset potentials for $H_2$ evolution are also lower than -1.0V, ranging from -2.0V to -2.5V, again depending on the microemulsion composition. It should be noted that onset potentials can differ between electrolytes, due to factors such as pH differences as well as differences between reference electrodes. Therefore, merely comparing, for example, the reduction reaction onset potentials of electrolytes cannot give meaningful information about the electrochemical stability windows of those electrolytes. Onset potentials become meaningful for electrochemical stability of electrolyte compositions when both the reduction and oxidation onset potentials are known, as the difference between the two gives the electrochemical stability window. In case of the microemulsions of the Examples, the electrochemical stability windows are significantly wider than that of the window for 0.1 M aq. KCl (e.g. a maximum of ~4.5V for ME1 compared to 2.25 V for aqueous KCl).

Example 3: Conductivity of Microemulsions

The conductivity tests for all samples were performed using a ECTestr11 (Eutech Instruments) conductivity meter. The device was calibrated using an Enviroquip conductivity calibration standard (1413 µS/cm@25° C.) before the measurements were made. Conductivity measurements for each microemulsion samples are shown in Table 1.

TABLE 1

| | Type | Non-polar (water-immiscible) | (weight %) | Polar (aqueous) | (weight %) | Surfactant | (weight %) | Co-surfactant/co-solvent | (weight %) | Window (vs Ag/AgCl) | Window, V | Conductivity (mS/cm) |
|---|---|---|---|---|---|---|---|---|---|---|---|---|
| ME1 | O/W microemulsion with anionic surfactant | Cyclohexane | 3.2 | Water | 82.1 | SDS | 4.9 | Butanol | 9.8 | −2 to 2.5 | 4.5 | 7.5 |

TABLE 1-continued

| Type | | Non-polar (water-immiscible) | (weight %) | Polar (aqueous) | (weight %) | Surfactant | (weight %) | Co-surfactant/co-solvent | (weight %) | Window (vs Ag/AgCl) | Window, V | Conductivity (mS/cm) |
|---|---|---|---|---|---|---|---|---|---|---|---|---|
| ME2 | O/W microemulsion with anionic surfactant | Toluene | 3.2 | Water | 82.1 | SDS | 4.9 | Butanol | 9.8 | −2 to 1.5 | 3.5 | 7.5 |
| ME2b | Bicontinuous microemulsion with anionic surfactant | Toluene | 31 | Water | 40 | SDS | 9.67 | Butanol | 19.34 | −2 to 1.5 | 3.5 | 6.7 |
| ME3 | O/W microemulsion with anionic surfactant | 1,2-dichlorobenzene | 3.2 | Water | 82.1 | SDS | 4.9 | Butanol | 9.8 | −2 to 2 | 4 | 7.9 |
| ME4 | O/W microemulsion with cationic surfactant | Hexane | 3 | Water | 82 | CTAC | 5 | Butanol | 10 | −2.5 to 1.25 | 3.75 | 7.2 |
| ME5 | O/W microemulsion with anionic surfactant | p-xylene | 3.2 | Water | 82.1 | SDS | 4.9 | Butanol | 9.8 | −2.25 to 1.5 | 3.75 | 7 |
| ME6 | Bi-continuous microemulsion | Dichloromethane | 26 | 0.1M KCl | 36.5 | | | Ethanol | 37.5 | −2 to 1.25 | 3.25 | 1.49 |
| ME10 | O/W microemulsion with cationic surfactant | Chloroform | 6.3 | Water | 89.8 | CPC | 3.9 | | | −0.25 to 1.25 | 1.5 | 3.7 |
| ME11 | O/W microemulsion with anionic surfactant | Petroleum ether | 5 | Water | 85 | SDS | 4 | Pentanol | 6 | −2 to 2 | 4 | 6.8 |
| ME12 | O/W microemulsion with anionic surfactant | Acetophenone | 3.2 | Water | 82.1 | SDS | 4.9 | Butanol | 9.8 | −1 to 2 | 3 | 7 |
| ME13 | O/W microemulsion with anionic surfactant | Ethyl benzoate | 3.2 | Water | 82.1 | SDS | 4.9 | Butanol | 9.8 | −1.5 to 2 | 3.5 | 7.4 |
| ME14 | O/W microemulsion with non-ionic surfactant | Cyclohexane | 10 | Water | 65.7 | Triton X-100 | 24.3 | — | — | −2 to 2 | 4 | Not measured |
| Comparison | Aqueous soln of 0.1M KCl | | | 0.1M KCl | | | | | | −1 to 1.25 | 2.25 | |

(SDS = sodium dodecyl sulfate, CTAC = cetyltrimethylammonium chloride, CPC = cetylpyridinium chloride); O/W = oil in water.

Example 4: Electrochemical Experimentation in Microemulsions

For each microemulsion sample, an amount of ferrocene was weighed and dissolved in the water-immiscible phase component to achieve a 100 mM concentration in the oil phase before preparing the microemulsions according to Example 1.

Cyclic voltammetry analysis of each sample was performed using a glassy carbon working electrode, a platinum counter electrode and a Ag/AgCl reference electrode, using a Metrohm Autolab PGSTAT302 potentiostat. Scan rate of 100 mV/s was used.

Voltammograms of ferrocene in each of the samples are shown in FIGS. 13 to 23.

The redox reactions of ferrocene can be interpreted as follows: During the forward scan (from 0 V to more positive voltages), ferrocene (Fc) is oxidized to ferrocenium (Fc$^+$) via a 1 electron oxidation, which can be seen in the form a cathodic peak current (ipc) at a potential $E_{pc}$. During the backward scan, the reduction of Fc$^+$ to Fc, again via a 1 electron reduction can be seen in the form an anodic peak current $i_{pa}$ at a potential $E_{pa}$. The redox potential of Fc/Fc$^+$ is thereby defined as the average of $E_{pa}$ and $E_{pc}$, whereas the reversibility of the redox process is defined in terms of the ratio $i_{pa}/i_{pc}$ (for a fully reversible process the ratio is 1).

The redox potential for the Fc/Fc$^+$ couple in each sample is around 0.3V, and the peak current ratios are close to 1, implying reversible electron transfer.

Example 5: Battery Construction

Batteries comprising the microemulsion electrolyte compositions of Example 1 were prepared on a benchtop in ambient conditions. Whatman™ glass microfiber filters were used as separators. The cells were made with a polyether ether ketone (PEEK) body, and steel current collectors sandwiching the cell together. Between 0.1 ml and 0.2 ml of the electrolyte composition was added to each cell before the last layer was added.

The electrodes used in the batteries were prepared from a pyrolytic graphite sheet (purchased from MTI Corporation) and a $V_2O_5$ slurry which was doctor bladed onto pyrolytic graphite sheet. The $V_2O_5$ slurry was made with 85 wt % $V_2O_5$, 9 wt % super conductive carbon (Super P) and 6% polyvinylidene fluoride (PVDF) binder. N-methyl pyrrolidone (NMP) was used as the solvent. The slurry was bladed onto the pyrolytic graphite sheet, and then the sheet was heated in a vacuum oven at 120° C. overnight to completely evaporate the solvent.

Battery electrolytes were prepared from microemulsion electrolyte compositions comprising:
ME1 in which the aqueous phase is 0.5 moldm$^{-3}$ MgSO$_4$
ME2 in which the aqueous phase is 0.1 moldm$^{-3}$ NaCl
ME2 in which the aqueous phase is 0.1 moldm$^{-3}$ LiCl
ME2 in which the aqueous phase is 0.1 moldm$^{-3}$ AlCl$_3$ Batteries prepared according to Example 5 were tested on a Neware battery analyser, BTS 3000 at a current density of 10 mAg$^{-1}$ and cycled between the voltages as shown in FIGS. 24 to 27. All experiments were performed at room temperature. Chronopotentiograms of each battery are shown in FIGS. 24 to 27. The FIGS. 24 to 27 show regular charge-discharge behaviour, and indicate that no water-splitting occurs during operation of the cells.

Figure 28:
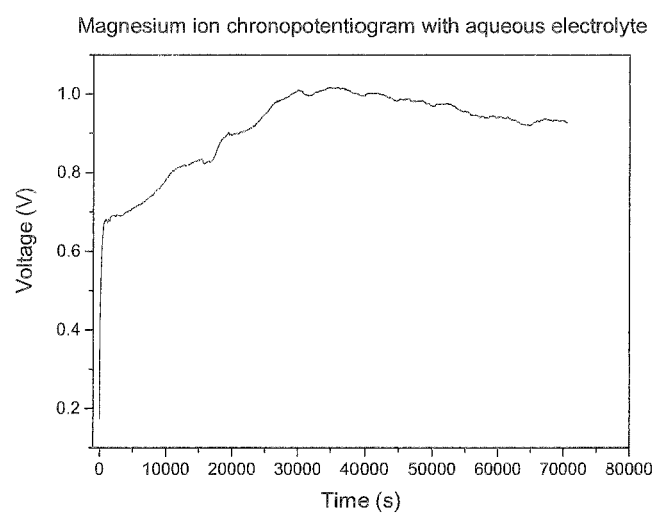
FIG. 28 is a chronopotentiogram of a magnesium ion battery with an aqueous electrolyte.

For comparison, FIG. 28 shows a chronopotentiogram of a magnesium ion battery comprising an aqueous electrolyte (not a microemulsion). FIG. 28 shows that the potential rises to about 0.7 V and then climbs in an irregular manner with many sharp increases and decreases to a maximum of just under 1 V before it slightly falls again. This cell failed to reach the 1 V upper cut-off of the battery analyser, despite charge continually flowing into the cell. The spikes and dips in the curve indicate that the battery is not charging and some other process is going on in the cell, most likely electrolyte decomposition. This is not observed in cells where the electrolyte is a microemulsion electrolyte composition (e.g. FIGS. 24 to 27), where the curves are smother, indicating regular charge-discharge behaviour as opposed to the behaviour of the aqueous cell.

Example 6: Redox Flow Battery Construction and Testing

The efficacy of microemulsion electrolyte compositions described herein was investigated in redox flow battery systems using a laboratory-scale conventional flow battery assembly.

A redox flow battery was prepared comprising carbon cloth electrodes, aluminium metal interdigitated flow plates cum current collectors, and a Celgard 4560 separator. Flow of electrolytes (catholyte and anolyte) was achieved using a peristaltic pump purchased from Schenzen coupled with Masterflex Tygon (E-3603) tubing.

Catholyte and anolyte compositions for the redox flow battery were prepared by adding an electrochemically active species to a microemulsion composition, ME2 (see Table 1). For this test, several different redox active organic species were used, as shown in Table 2 below. For each test, the anolyte and catholyte consisted of 10 mM active species in ME2 microemulsion.

TABLE 2

| Test no. | Catholyte active species | Anolyte active species | Cell voltage, V |
|---|---|---|---|
| 1 | Ferrocene | Menadione | ~1 |
| 2 | (2,2,6,6-Tetramethylpiperidin-1-yl)oxyl (TEMPO) | Menadione | ~1.2-1.3 |
| 3 | Phenothiazine | Menadione | ~1.5 |
| 4 | Dimethoxybenzene | Menadione | above 1.5 |
| 5 | Dimethoxybenzene | 2,1,3-benzothiadiazole | ~2.5 |

With reference to Table 2, above: Ferrocene is an organometallic redox active organic species. Menadione is neutral organic molecule redox active organic species, specifically a quinone. TEMPO is a stable organic radical. Phenothiazine is a neutral redox active organic species. Dimethoxybenzene is a neutral redox active organic species. 2,1,3-benzothiadiazole is another neutral redox active organic species. It is to be noted that phenothiazine and dimethoxybenzene can be substituted by different substituents, and each compound is part of a class of phenothiazines and dimethoxybenzenes.

In each test, 50 mL each of anolyte and catholyte were used with a constant flow rate of 20 mL/min. The redox flow battery charge/discharge test was carried out in a galvanostatic mode with a 10 mA current. Voltages were set within cut offs of 0 V to 1 V. The chronopotentiogram of the battery cell of Test no. 1 is shown at FIG. 29, showing regular charge-discharge behaviour.

Figure 29:
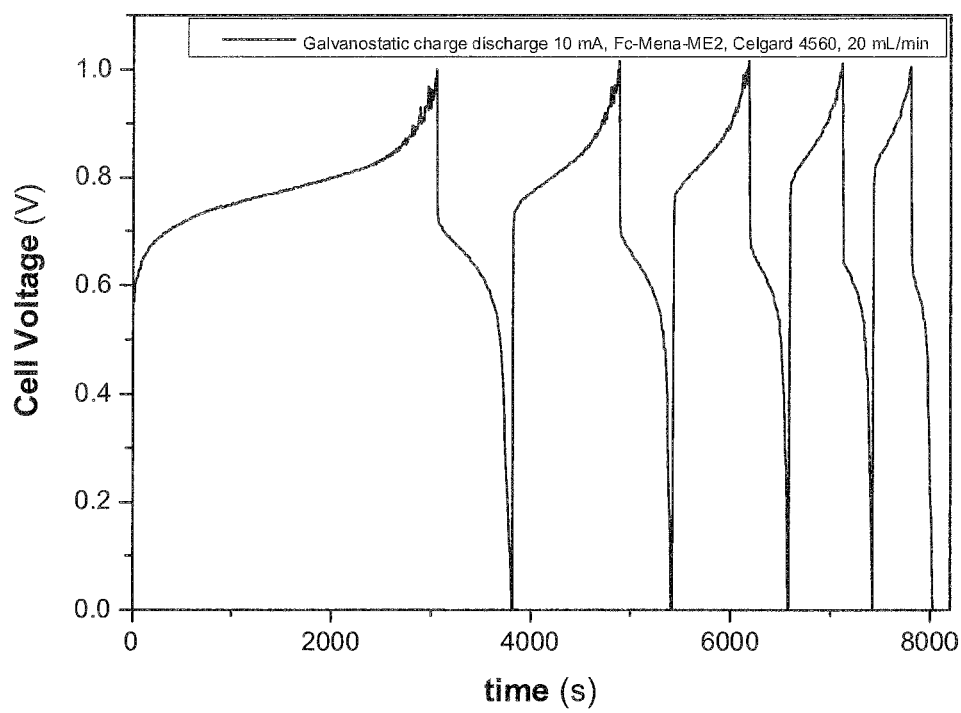
FIG. 29 is a chronopotentiogram of a redox flow battery comprising an ME2-based electrolyte described in Example 6.
Figure 30:
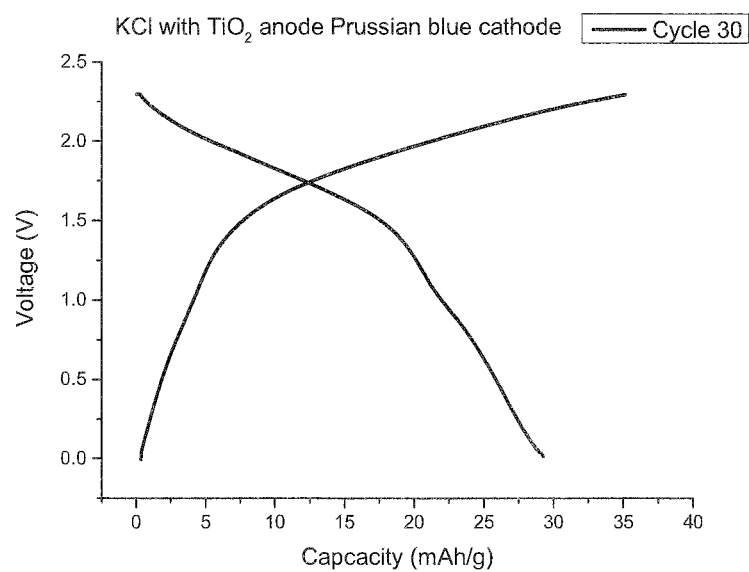
FIG. 30 is a charge-discharge curve of Cell 1 after 30 charge/discharge cycles.
Figure 31:
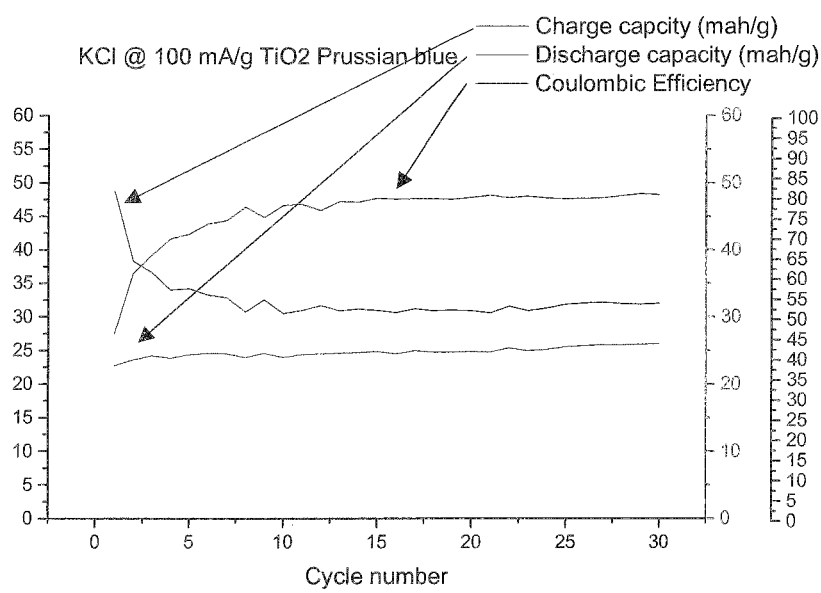
FIG. 31 shows the charge capacity (mAh/g), discharge capacity (mAh/g) and coulombic efficiency over repeated charge/discharge cycles of Cell 1.
Figure 32:
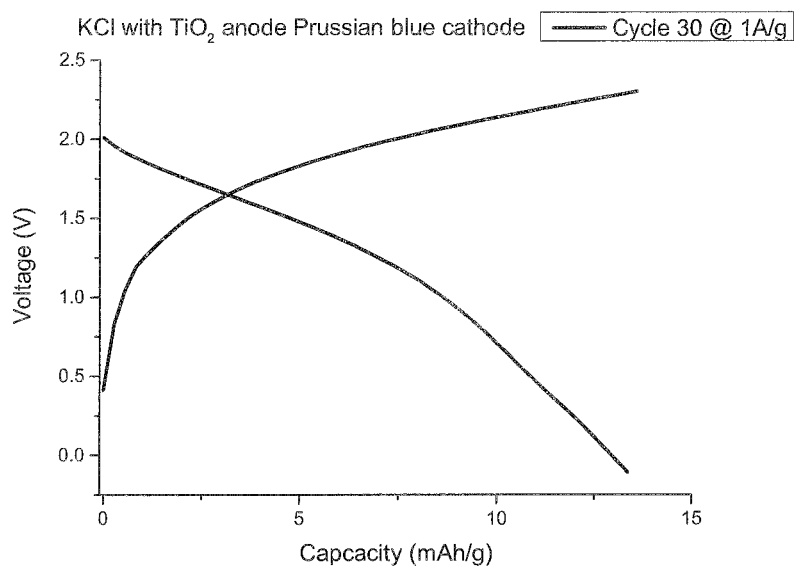
FIG. 32 is a charge-discharge curve of Cell 1 after 30 charge/discharge cycles, tested at 1 A/g.
Figure 33:
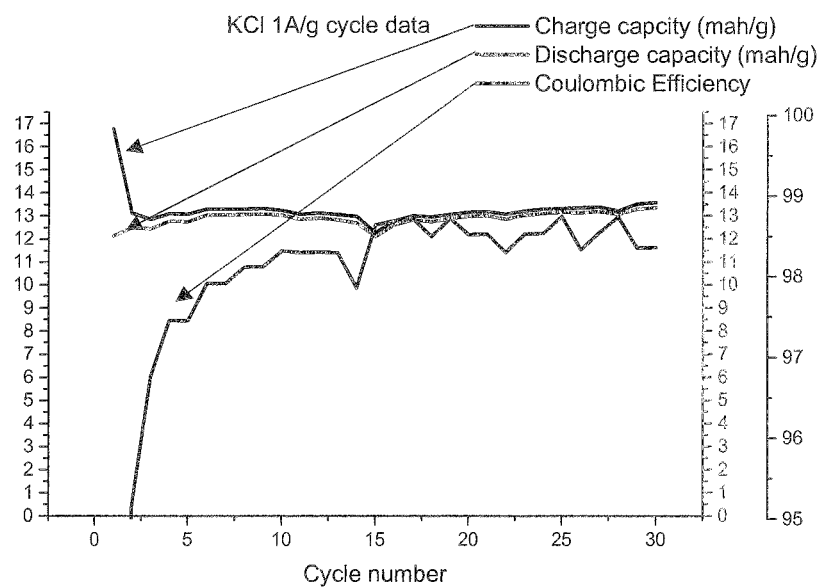
FIG. 33 shows the charge capacity (mAh/g), discharge capacity (mAh/g) and coulombic efficiency over repeated charge/discharge cycles of Cell 1, tested at 1 A/g.

FIG. 29 shows that the microemulsion electrolyte compositions can act as a conductive medium for the oxidation and reduction reactions of the redox active organic species, and can therefore be used as redox flow battery electrolytes. There are characteristic charging and discharging plateaus around 0.7 V.

FIG. 29 further shows that the microemulsion composition has good conductivity as an electrolyte, as the Figure shows the microemulsion composition to have a iR drop (voltage difference at the end of charge and beginning of discharge) expected from a typical redox flow battery of this assembly. The iR drop observed typically comes from the membrane and cell resistance and not from the electrolyte.

As neither ferrocene nor menadione is soluble in water, these redox active organic species are assumed to be dissolved in the water-immiscible phase of the microemulsion electrolyte composition yet regular charge/discharge behaviour is still observed. Thus, FIG. 29 is further proof the microemulsion electrolyte composition can dissolve and facilitate electrochemical reactions of the redox active organic species by virtue of having an electrochemically active oil phase.

Example 7: Ion Battery Construction and Testing

The efficacy of microemulsion electrolyte compositions described herein was investigated in ion cell systems. Ion batteries were constructed in Swagelok cells comprising the electrolyte described herein, an anode, a cathode, a polyether ether ketone (PEEK) body, glassy carbon current collectors, and glass microfiber separators.

The anode was prepared according to the following method: 255 mg of TiO$_2$ powder (Degussa, P-25), 27 mg super conductive carbon (Super P), and 18 mg polyvinylidene difluoride were combined with N-methyl pyrrolidone (NMP) to form a thick slurry. The slurry was then doctor bladed onto a pyrolytic graphite sheet (MTI Corporation) and dried in a vacuum oven at 120° C. for 12 hours.

For Cells 1 to 3, a cathode was prepared according to the following method: Prussian blue was prepared by combining equimolar amounts of FeCl$_3$ and potassium ferricyanide (K$_3$[Fe(CN)$_6$]) in water under vigorous stirring in ambient conditions. The mixture was dried and the resulting solid was crushed. 255 mg of Prussian blue powder, 27 mg super conductive carbon (Super P), and 18 mg polyvinylidene difluoride were combined with N-methyl pyrrolidone (NMP) to form a thick slurry. The slurry was then doctor bladed onto a pyrolytic graphite sheet (MTI Corporation) and dried in a vacuum oven at 120° C. for 12 hours.

For Cells 4 and 6, a $V_2O_5$ cathode was prepared according to the method described in Example 5.

For Cell 5, a $MoS_2$ cathode and graphite anode were used.

A microemulsion electrolyte (ME14) was prepared according to the following method: 65.7 wt % distilled water, 24.3 wt % Triton X-100 (t-octylphenoxypolyethoxyethanol) and 10 wt % cyclohexane were combined, sonicated for about one hour and then left to stir overnight. To ME14, 10 wt % of bis(2-methoxyethyl) ether (Diglyme) was added. The final composition of the microemulsion is therefore: 59.7 wt % distilled water, 22.1 wt % Triton X-100, 9.1 wt % cyclohexane and 10 wt % diglyme.

For Cells 1 to 3, the corresponding metal chloride salt was added to ME14 to give a cation concentration of 1 mol/kg. For Cell 4, LiCl was added to ME14 to give a concentration of 0.1 mol/kg. For Cell 5, $MgCl_2$ was added to ME14 to give a concentration of 0.1 mol/kg.

Accordingly, the constructed cells have the composition described in Table 3:

TABLE 3

| Cell no. | Anode | Cathode | Electrolyte |
|---|---|---|---|
| 1 | $TiO_2$ | Prussian blue | ME14 with 1 mol/kg KCl |
| 2 | $TiO_2$ | Prussian blue | ME14 with 1 mol/kg $CaCl_2$ |
| 3 | $TiO_2$ | Prussian blue | ME14 with 1 mol/kg NaCl |
| 4 | $TiO_2$ | $V_2O_5$ | ME14 with 0.1 mol/kg LiCl |
| 5 | Graphite | $MoS_2$ | ME14 with 0.1 mol/kg $MgCl_2$ |
| 6 | $TiO_2$ | $V_2O_5$ | ME14 (Control) |

Between 0.1 ml and 0.2 ml of the electrolyte composition was added to each cell construction before the last layer was added.

Charge/Discharge

FIGS. 30 to 42 show the charge-discharge behaviour of Cells 1 to 5. Cells 1 to 3, 5 and 6 were tested on a Neware battery analyser, BTS 3000 at a current density of 50 mA/g. Cell 4 was tested at a current density of 10 mA/g. Cells were run with a constant charge and discharge current of 100 mA/g between 0 V and about 2.0 V (the exact upper cut-off ranges were from 1.9 V to 2.2 V, depending on cell). All experiments were performed at room temperature.

Figure 34:
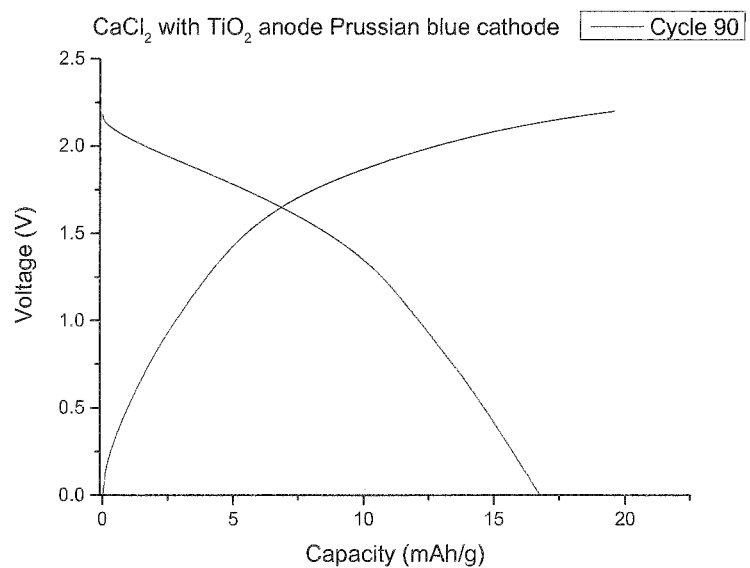
FIG. 34 is a charge-discharge curve of Cell 2 after 90 charge/discharge cycles
Figure 35:
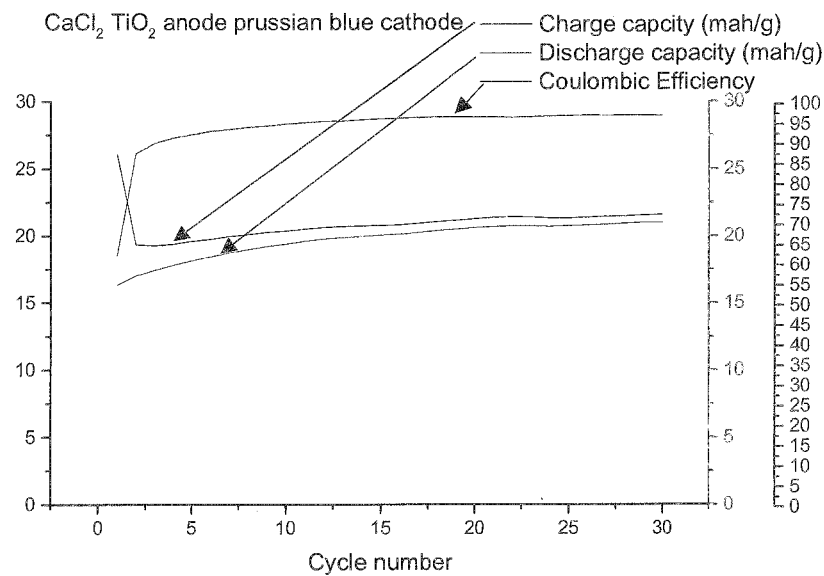
FIG. 35 shows the charge capacity (mAh/g), discharge capacity (mAh/g) and coulombic efficiency over repeated charge/discharge cycles of Cell 2.
Figure 36:
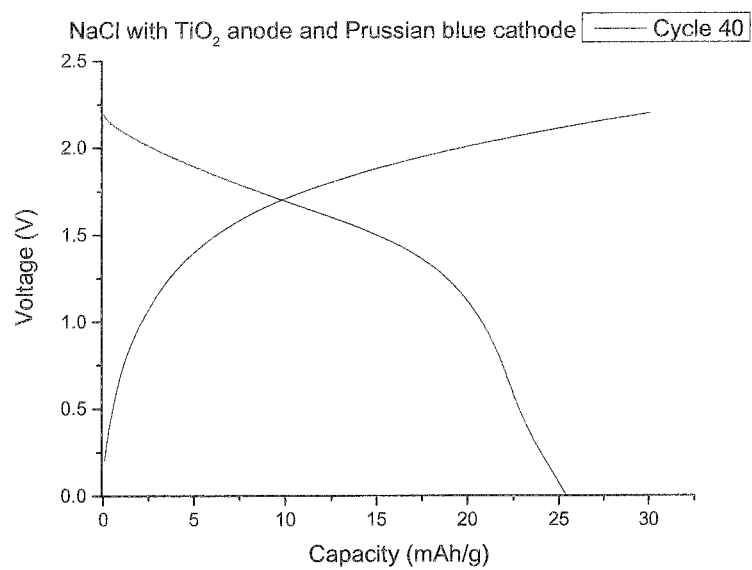
FIG. 36 is a charge-discharge curve of Cell 3 after 40 charge/discharge cycles.
Figure 37:
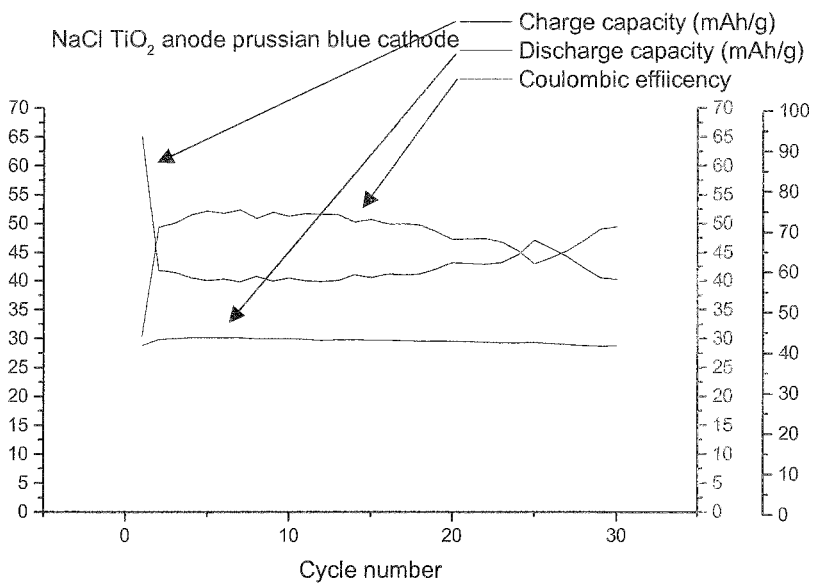
FIG. 37 shows the charge capacity (mAh/g), discharge capacity (mAh/g) and coulombic efficiency over repeated charge/discharge cycles of Cell 3.
Figure 38:
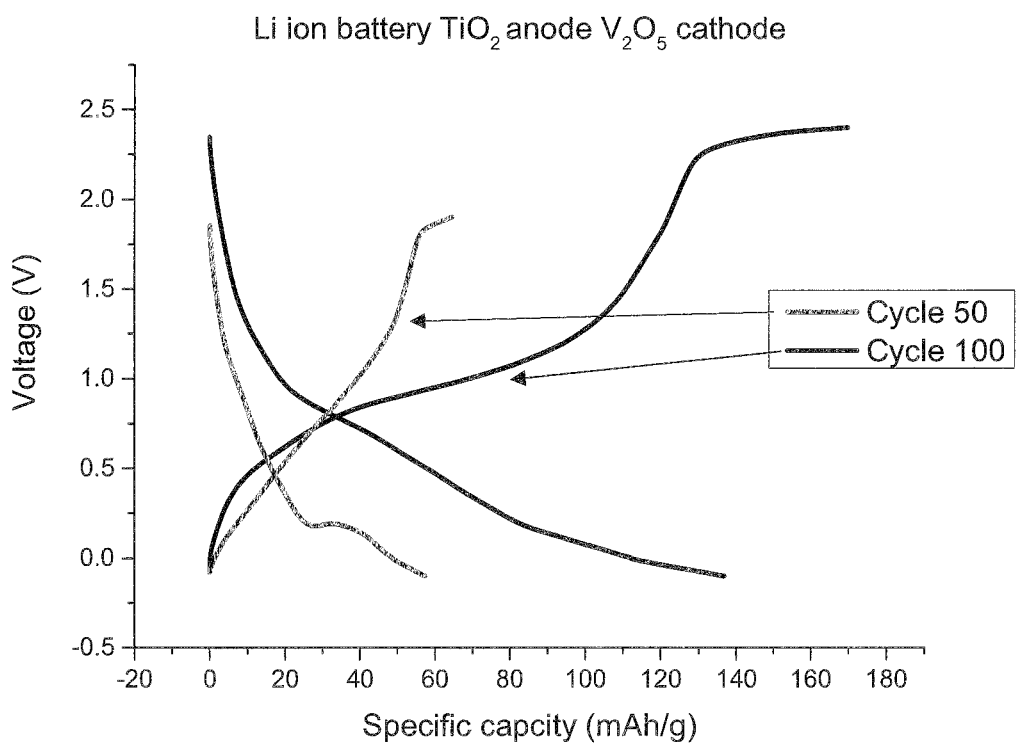
FIG. 38 is a charge-discharge curve of Cell 4 after 50 and 100 charge/discharge cycles
Figure 39:
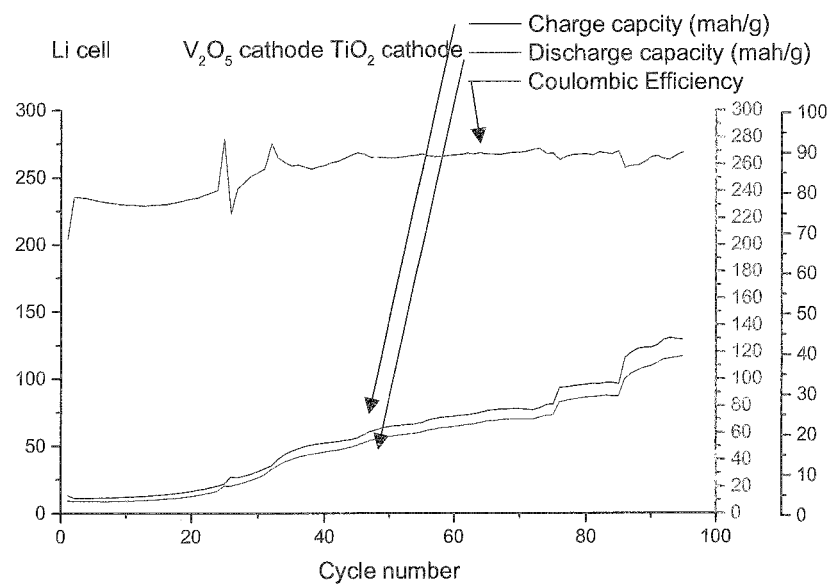
FIG. 39 shows the charge capacity (mAh/g), discharge capacity (mAh/g) and coulombic efficiency over repeated charge/discharge cycles of Cell 4.
Figure 40:
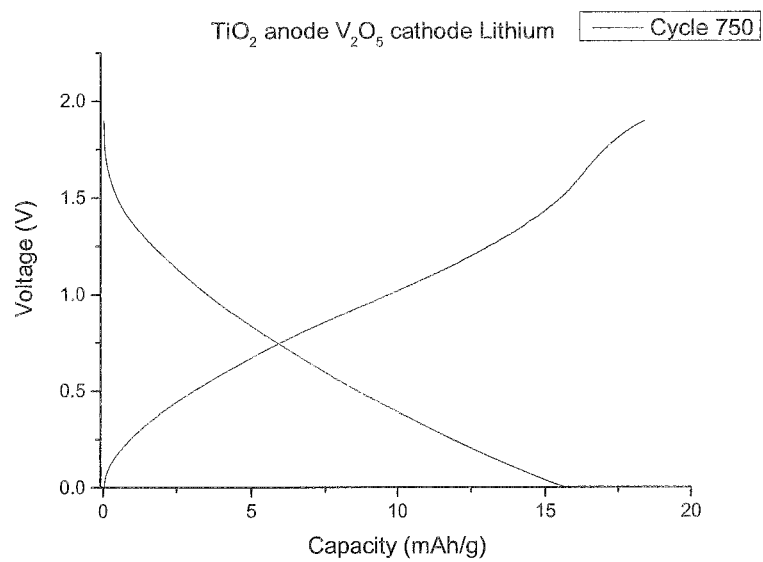
FIG. 40 is a charge-discharge curve of Cell 4 after 750 charge/discharge cycles
Figure 41:
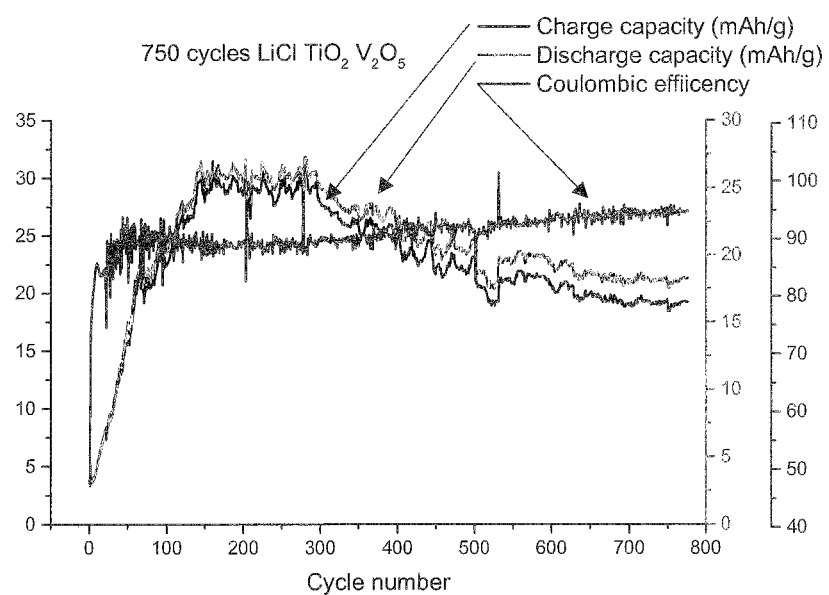
FIG. 41 shows the charge capacity (mAh/g), discharge capacity (mAh/g) and coulombic efficiency over repeated charge/discharge cycles of Cell 4 for charge/discharge 750 cycles.

FIGS. 30 to 33 show the analysis of Cell 1 (KCl). FIGS. 34 and 35 show the analysis of Cell 2 ($CaCl_2$)). FIGS. 36 and 37 show the analysis of Cell 3 (NaCl). Testing of Cells 1 to 3, shown in FIGS. 30 to 37, showed no evidence of water splitting despite operating at greater than 2V. The shape of the charge-discharge curves in FIGS. 30, 32, 34 and 36 indicate redox reactions are occurring in the cell. The nominal cell voltage (taken as approximately where the charge and discharge curves intersect) is approximately 1.7V which is well above the theoretical 1.23V water splitting potential.

FIGS. 38 to 41 show the analysis of Cell 4 (LiCl). This cell shows a capacity of greater than 140 mAh/g. The nominal cell voltage is approximately 0.7V. There is no evidence of water splitting even though it is charged to 2.4V.

Figure 42:
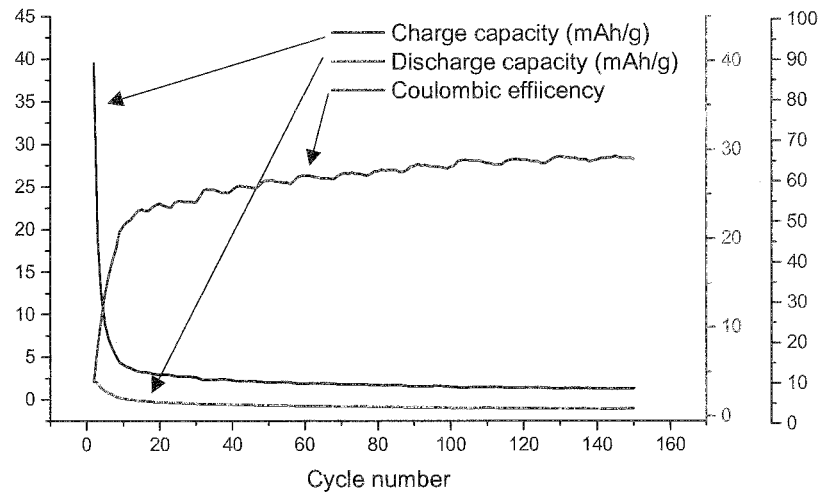
FIG. 42 shows the charge capacity (mAh/g), discharge capacity (mAh/g) and coulombic efficiency over repeated charge/discharge cycles of Cell 5.

FIG. 42 shows the analysis of Cell 5 ($MgCl_2$).

Regular charge-discharge behaviour was observed over multiple cycles, indicating that water-splitting does not occur during operation of the cells. For example, the Figures show that Cells 1-5 retain their charge and discharge capacity over 30 cycles.

Cyclic Voltammetry Data

Figure 43:
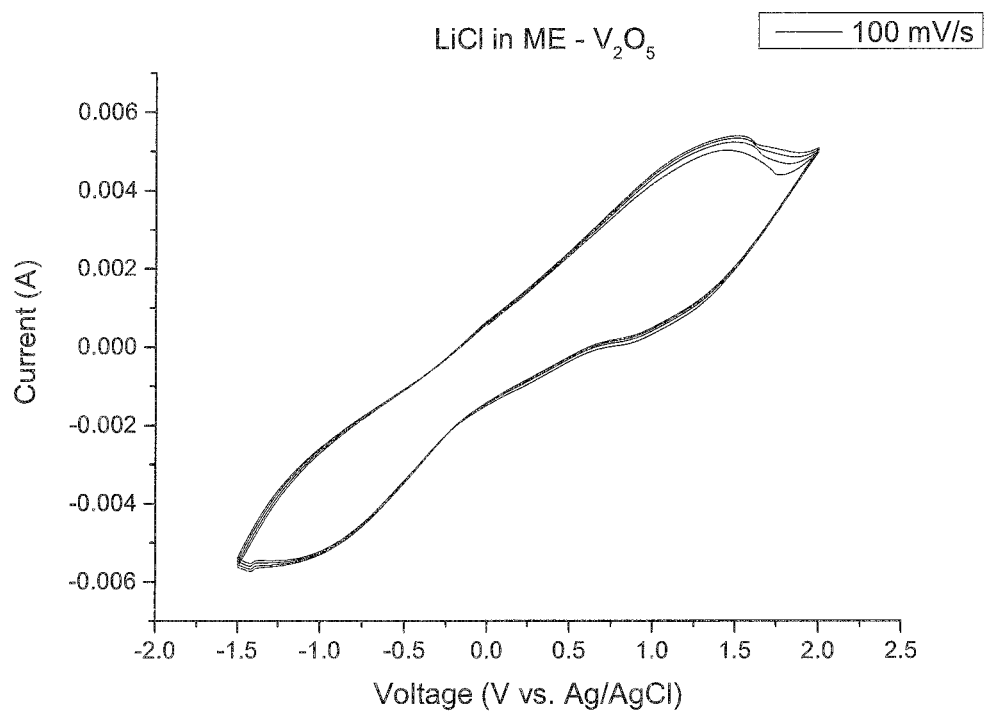
FIG. 43 is a cyclic voltammogram of Cell 5 ($V_2O_5$ electrode).
Figure 44:
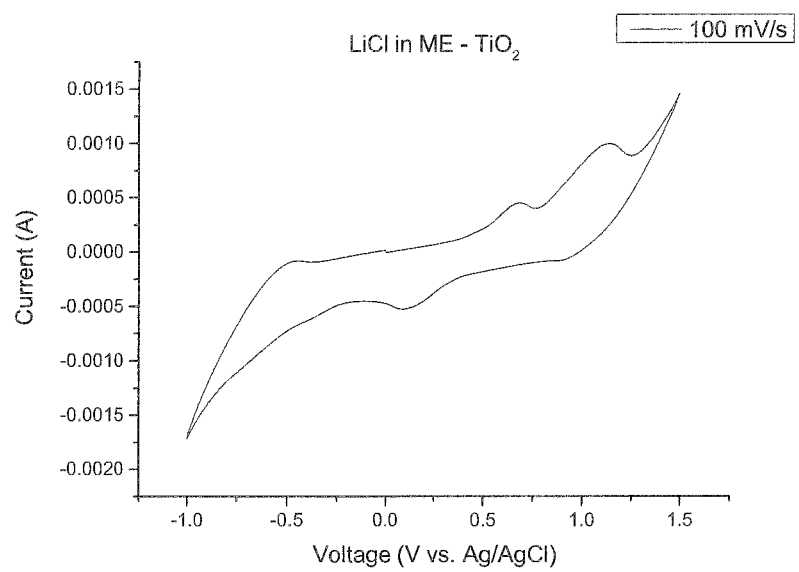
FIG. 44 is a cyclic voltammogram of Cell 5 ($TiO_2$ electrode).
Figure 45:
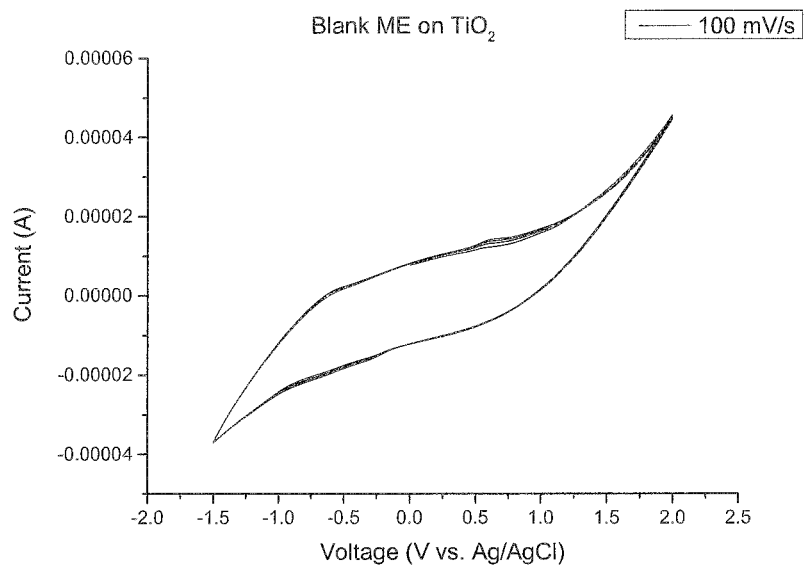
FIG. 45 is a cyclic voltammogram of Cell 6 ($TiO_2$ electrode).

Cyclic voltammetry analysis (Ag/AgCl reference electrode) of Cell 4 (1.0 mol/kg LiCl in ME14) and Cell 6 (ME14 control) was performed using a Metrohm Autolab PGSTAT302 potentiostat. A scan rate of 100 mV/s was used. Voltammograms are shown in FIGS. 43 to 45.

For the $V_2O_5$ electrode of Cell 4, the cell was analysed from −1.5 V to 2.0 V (vs Ag/AgCl). For the $TiO_2$ electrode of Cell 4, the cell was analysed from −1.0 to 1.5 V (vs Ag/AgCl). Analysis of each electrode indicates that water splitting does not occur in this range. These measurements were compared to a cyclic voltammetry measurement of Cell 6 (a control microemulsion of ME14 with no other dissolved salts), which confirmed the electrochemical reactions observed in Cell 4 is due to the action of lithium; Cell 6 shows only capacitance, no electrochemical activity.

Example 8—Supercapacitor

A supercapacitor comprising the microemulsion electrolyte composition described herein was constructed and analysed.

Electrodes were prepared as follows: A 70 wt % zeolite slurry solution was prepared by adding NMP dropwise until it completely dissolved 0.05 g of PVDF (about 2 mL). To this solution, 0.10 g of carbon black and 0.35 g of 4 Å molecular sieves were added, which formed a viscous black slurry. The slurry was then doctor bladed onto a pyrolytic graphite sheet (MTI Corporation) and dried in a vacuum oven at 120° C. for 12 hours to form the zeolite electrodes.

A supercapacitor was assembled comprising zeolite electrodes (as both anode and cathode), glassy carbon current collectors, an electrolyte composition of ME14 comprising 1 mol/kg KCl, a glass microfiber separator, and a polyether ether ketone (PEEK) body.

Figure 46:
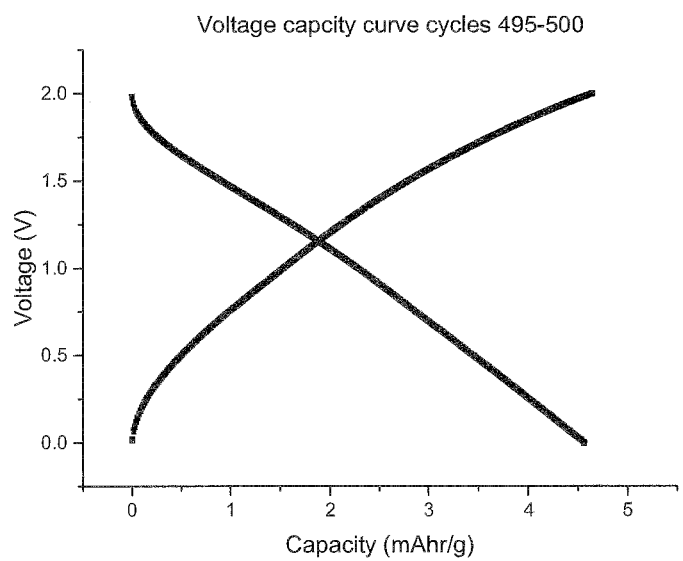
FIG. 46 shows charge-discharge curves of the supercapacitor of Example 8 for charge-discharge cycles 495-500.
Figure 47:
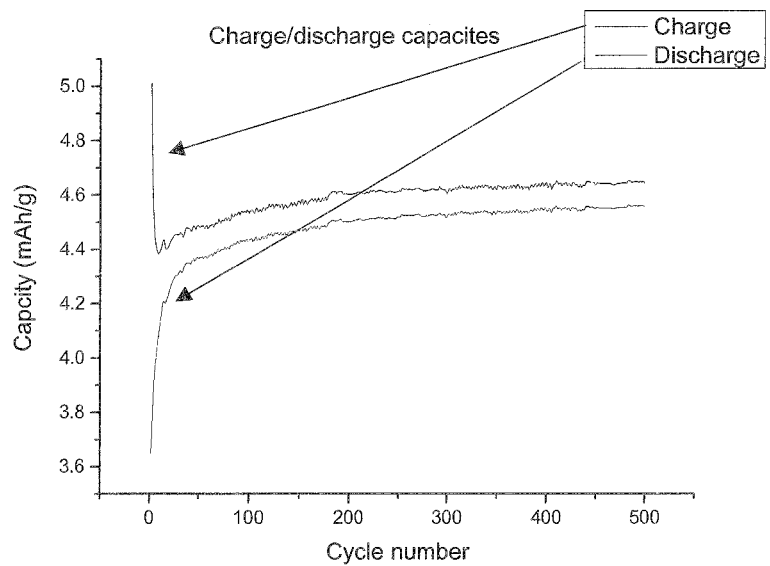
FIG. 47 shows the charge capacity and discharge capacity (mAh/g) of the supercapacitor of Example 8 over repeated cycles.
Figure 48:
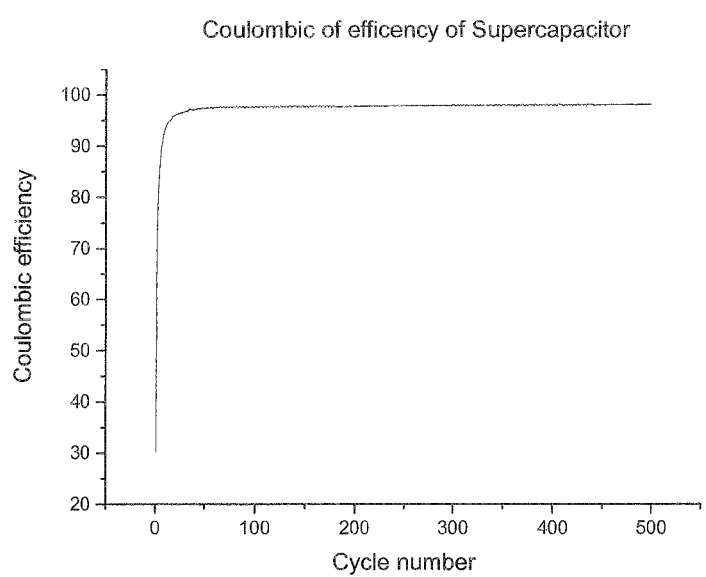
FIG. 48 shows the coulombic efficiency of the supercapacitor of Example 8 over repeated cycles.

The supercapacitor was cycled between 0 and 2V at 100 mA/g for 500 cycles. As shown in FIGS. 46-48, the supercapacitor has a reversible capacity of about 4.5 mAh/g (FIGS. 46 and 47) and a coulombic efficiency of ~98% (FIG. 48). The shape of the voltage capacity curve (FIG. 46) indicates a purely capacitive process. The capacitance was calculated to be approximately 16.7 F/g.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification. The specific compositions and methods described herein are representative of preferred examples and are exemplary and not intended as limitations on the scope of the invention. Other aspects and examples will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed as essential. Thus, for example, in each instance described or used herein, in embodiments or examples of the present invention, any of the terms "comprising", "consisting essentially of", and "consisting of" may be replaced with either of the other two terms in the specification. Also, the terms "comprising", "including", "containing", etc. are to be read expansively and without limitation. The assays and methods illustratively described herein suitably may be practiced in differing orders of steps, and that they are not necessarily restricted to the orders of

What we claim is:

1. An energy storage device comprising:
a liquid electrolyte composition wherein the liquid electrolyte composition comprises a microemulsion, and wherein the microemulsion comprises an aqueous phase and a water-immiscible phase; and
wherein the energy storage device is an electrically rechargeable electrochemical energy storage device.

2. The device of claim 1, wherein the aqueous phase is a continuous phase.

3. The device of claim 2, wherein the water-immiscible phase is a dispersed phase.

4. The device of claim 1, wherein the microemulsion is a bicontinuous microemulsion.

5. The device of claim 1, wherein the microemulsion further comprises a dissolved salt.

6. The device of claim 5, wherein the dissolved salt is selected from the group consisting of: a lithium salt, a sodium salt, a potassium salt, a magnesium salt, a calcium salt, and an aluminum salt.

7. The device of claim 6, wherein the dissolved salt is at a concentration of between 0.001 mol/kg and 10 mol/kg.

8. The device of claim 1, wherein the microemulsion further comprises one or more redox active organic species.

9. The device of claim 8, wherein the redox active organic species are dissolved in the water-immiscible phase or aqueous phase.

10. The device of claim 8, wherein the redox active organic species are dissolved in the water-immiscible phase.

11. The device of claim 1, wherein the water-immiscible phase comprises an organic solvent.

12. The device of any claim 11, wherein the organic solvent is selected from the group consisting of aliphatic solvents; aromatic solvents; halogenated solvents; substantially water immiscible ketone solvents; substantially water immiscible ester solvents; or a combination thereof.

13. The device of claim 1, wherein the microemulsion further comprises a surfactant, a co-surfactant and/or co-solvent.

14. The device of claim 1, further comprising an anodic electrode and a cathodic electrode and optionally a current collector, wherein at least a portion of the surface of one or more of the anodic electrode, cathodic electrode and current collector is hydrophobic.

15. The device of claim 14, wherein the portion of the surface of one or more of the anodic electrode, cathodic electrode and current collector is non-metallic or conductive carbon or a conductive polymer.

16. The device of claim 14, further including an ion permeable separator located between the cathodic electrode and anodic electrode.

17. The device of claim 1, wherein the device has a cell voltage of greater than 1.23 V.

18. A method for using an electrically rechargeable electrochemical energy storage device comprising connecting the electrically rechargeable electrochemical energy storage device to a load and supplying a charge to the load, wherein the electrically rechargeable electrochemical energy storage device comprises an electrolyte composition, wherein the electrolyte composition comprises a microemulsion, and wherein the microemulsion comprises an aqueous phase and a water-immiscible phase.

19. An electrolyte composition when used in an electrically rechargeable electrochemical energy storage device, wherein the electrolyte composition comprises a microemulsion, wherein the microemulsion comprises an aqueous phase and a water-immiscible phase.

* * * * *